US012574851B2

(12) United States Patent
Wu et al.

(10) Patent No.: US 12,574,851 B2
(45) Date of Patent: Mar. 10, 2026

(54) LOW-POWER WAKE-UP SIGNAL AND METHOD AND DEVICE USING THE SAME

(71) Applicant: Samsung Electronics Co., Ltd., Gyeonggi-do (KR)

(72) Inventors: Min Wu, Beijing (CN); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 446 days.

(21) Appl. No.: 18/112,267

(22) Filed: Feb. 21, 2023

(65) Prior Publication Data

US 2023/0269666 A1 Aug. 24, 2023

(30) Foreign Application Priority Data

Feb. 21, 2022 (CN) .......................... 202210157480.7

(51) Int. Cl.
| | |
|---|---|
| *H04W 52/02* | (2009.01) |
| *H04W 68/02* | (2009.01) |
| *H04W 72/232* | (2023.01) |

(52) U.S. Cl.
CPC ....... *H04W 52/0235* (2013.01); *H04W 68/02* (2013.01); *H04W 72/232* (2023.01)

(58) Field of Classification Search
CPC ........... H04W 52/0235; H04W 72/232; H04W 68/02
See application file for complete search history.

(56) References Cited

U.S. PATENT DOCUMENTS

| | | | | |
|---|---|---|---|---|
| 2018/0332532 A1* | 11/2018 | Johansson | ............. | H04W 24/02 |
| 2019/0150094 A1* | 5/2019 | Liu | ........................ | H04W 24/10 370/311 |

| | | | | |
|---|---|---|---|---|
| 2020/0107267 A1 | 4/2020 | Wu et al. | | |
| 2020/0145921 A1* | 5/2020 | Zhang | ............... | H04W 52/0235 |
| 2020/0275296 A1* | 8/2020 | Chen | ...................... | H04W 24/08 |
| 2020/0396685 A1 | 12/2020 | Nam et al. | | |
| 2021/0022077 A1* | 1/2021 | Mazloum | .............. | H04W 72/12 |
| 2021/0045056 A1* | 2/2021 | Nam | ................. | H04W 52/0216 |

(Continued)

FOREIGN PATENT DOCUMENTS

| | | |
|---|---|---|
| CN | 110958672 | 4/2020 |
| WO | WO 2018/212867 | 11/2018 |

(Continued)

OTHER PUBLICATIONS

European Search Report dated May 16, 2025 issued in counterpart application No. 23756704.5-1206, 17 pages.

(Continued)

*Primary Examiner* — Jael M Ulysse

(74) *Attorney, Agent, or Firm* — The Farrell Law Firm, P.C.

(57) ABSTRACT

The disclosure relates to a 5G or 6G communication system for supporting a higher data. transmission rate. Disclosed is a low-power wake-up signal, a method, and a device using the same, in which the method that is performed by a user equipment (UE) includes monitoring the wake-up signal in a radio resource control (RRC) non-connected mode, with the wake-up signal including a single wake-up signal or a wake-up signal set consisting of multiple wake-up signals; and, based on a result of the monitoring of wake-up signal, deciding whether to monitor a corresponding paging occasion.

20 Claims, 19 Drawing Sheets

(56)             References Cited

U.S. PATENT DOCUMENTS

| | | | | |
|---|---|---|---|---|
| 2021/0329552 | A1* | 10/2021 | Yang | H04W 52/0229 |
| 2022/0078710 | A1* | 3/2022 | Xu | H04W 72/23 |
| 2022/0095226 | A1 | 3/2022 | Chang et al. | |
| 2022/0124622 | A1* | 4/2022 | Islam | H04W 72/20 |
| 2022/0132518 | A1* | 4/2022 | Lee | H04W 68/005 |
| 2022/0167270 | A1* | 5/2022 | Ye | H04W 68/02 |
| 2022/0264345 | A1* | 8/2022 | Zhou | H04W 76/19 |
| 2022/0353814 | A1* | 11/2022 | Takeda | H04W 52/0229 |
| 2022/0394617 | A1* | 12/2022 | Li | H04W 52/0235 |
| 2023/0037852 | A1* | 2/2023 | Islam | H04L 5/0094 |
| 2023/0051117 | A1* | 2/2023 | Tsai | H04L 5/0048 |
| 2023/0143590 | A1* | 5/2023 | Li | H04W 68/02 |
| | | | | 370/329 |
| 2023/0180130 | A1* | 6/2023 | Gupta | H04W 52/0235 |
| | | | | 370/329 |
| 2023/0403679 | A1* | 12/2023 | Zhou | H04L 5/001 |
| 2024/0267988 | A1* | 8/2024 | Zhou | H04W 76/11 |
| 2024/0314601 | A1* | 9/2024 | Zhou | H04W 52/0235 |
| 2024/0381317 | A1* | 11/2024 | Hwang | H04W 68/005 |
| 2025/0056408 | A1* | 2/2025 | Xu | H04W 76/28 |
| 2025/0081104 | A1* | 3/2025 | Liu | H04W 52/0232 |

FOREIGN PATENT DOCUMENTS

| | | |
|---|---|---|
| WO | WO 2020/114483 | 6/2020 |
| WO | WO 2021/097792 | 5/2021 |
| WO | WO 2021/162623 | 8/2021 |

OTHER PUBLICATIONS

International Search Report dated May 1, 2023 issued in counterpart application No. PCT/KR2023/002484, 7 pages.

* cited by examiner

WUS RESOURCES THAT CANNOT BE USED
DUE TO COLLISION WITH UPLINK SYMBOLS

TIME WINDOW CONTAINING
MULTIPLE WUS RESOURCES

LOW-POWER WAKE-UP SIGNAL AND METHOD AND DEVICE USING THE SAME

CROSS-REFERENCE TO RELATED APPLICATION(S)

This application is based on and claims priority under 35 U.S.C. § 119(a) to Chinese Patent Application No. 202210157480.7, which was filed in the China National Intellectual Property Administration on Feb. 21, 2022, the entire disclosure of which is incorporated herein by reference.

BACKGROUND

1. FIELD

The disclosure generally relates to a wireless communication technology and, in particular, to a low-power wake-up signal, and a method and a device using the same.

2. DESCRIPTION OF THE RELATED ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amounts of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-Everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

An aspect of the disclosure provides a method performed by a user equipment (UE), which includes monitoring a wake-up signal in a radio resource control (RRC) non-connected mode, with the wake-up signal including a single wake-up signal or a wake-up signal set consisting of multiple wake-up signals and, based on a result of the monitoring of the wake-up signal, deciding whether to monitor a corresponding paging occasion.

Another aspect of the disclosure provides a UE in a communication network that includes a transceiver and a processor coupled to the transceiver and configured to monitor a wake-up signal in an RRC non-connected mode, with the wake-up signal including a single wake-up signal or a wake-up signal set consisting of multiple wake-up signals; and, based on a result of monitoring the wake-up signal, decide whether to monitor a corresponding paging occasion.

BRIEF DESCRIPTION OF THE DRAWINGS

The above and other aspects, features, and advantages of certain embodiments will be more apparent from the following description taken in conjunction with the accompanying drawings, in which.

Figures 15, 16:
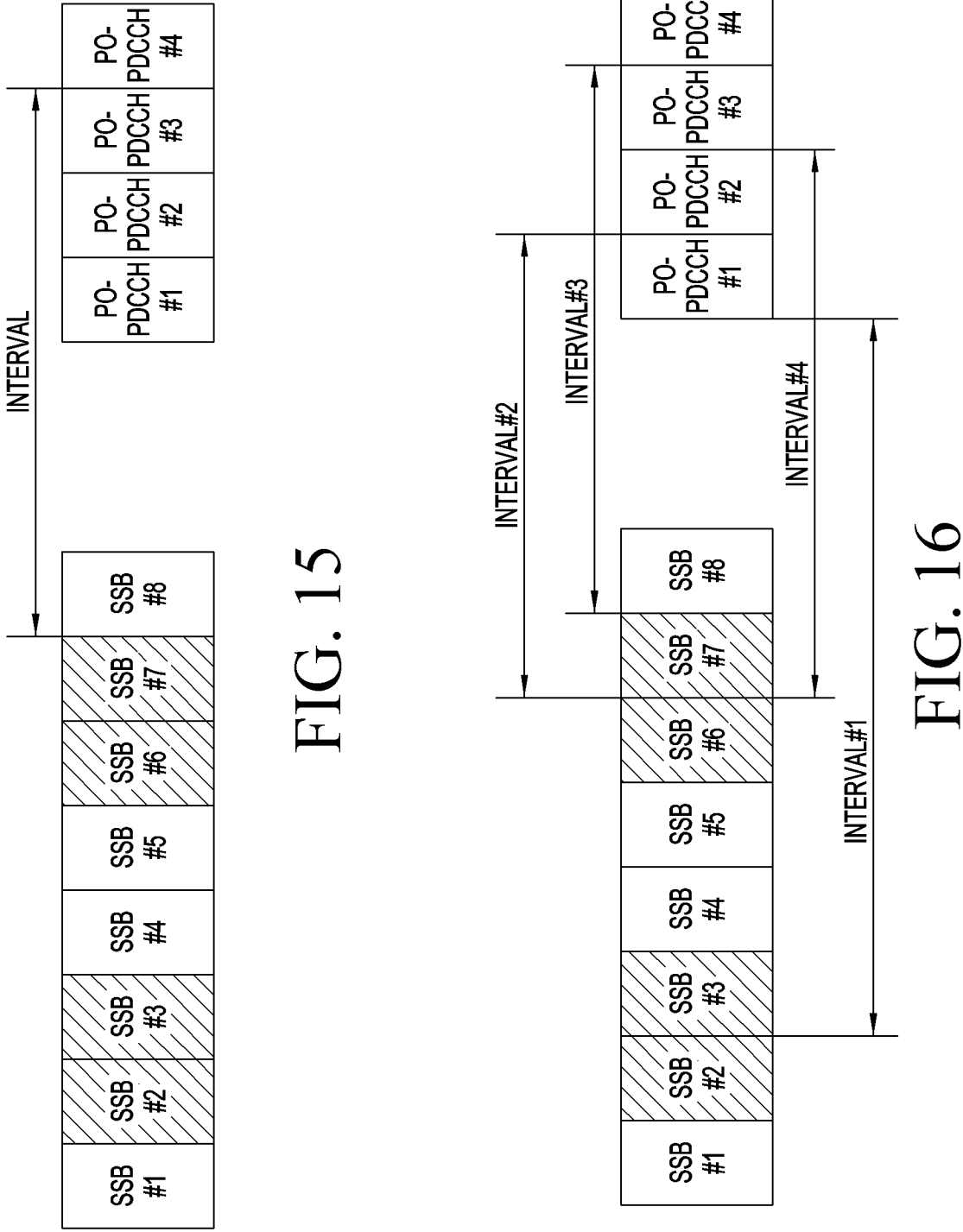
Figures 17, 18:
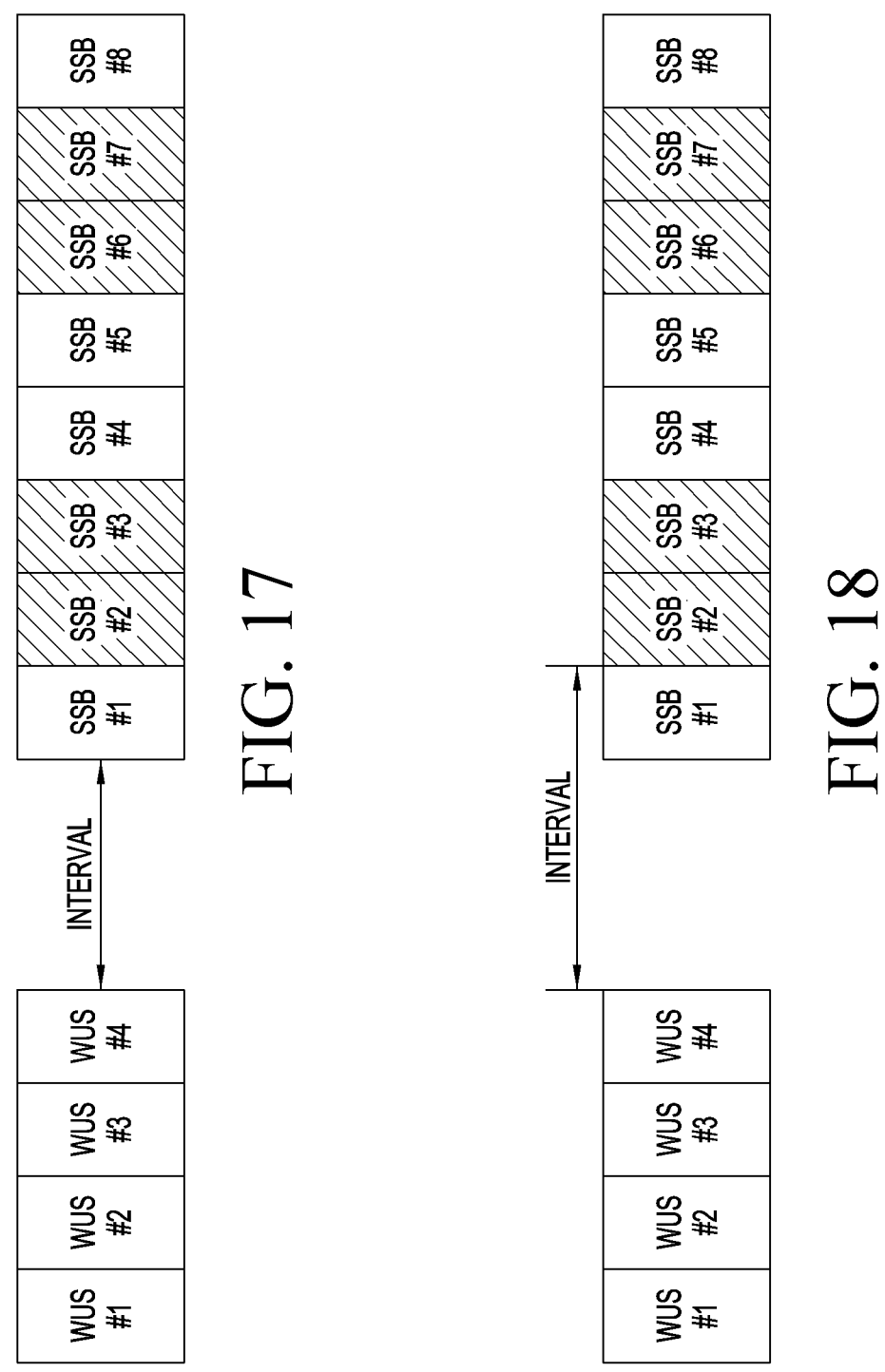
Figures 19, 20:
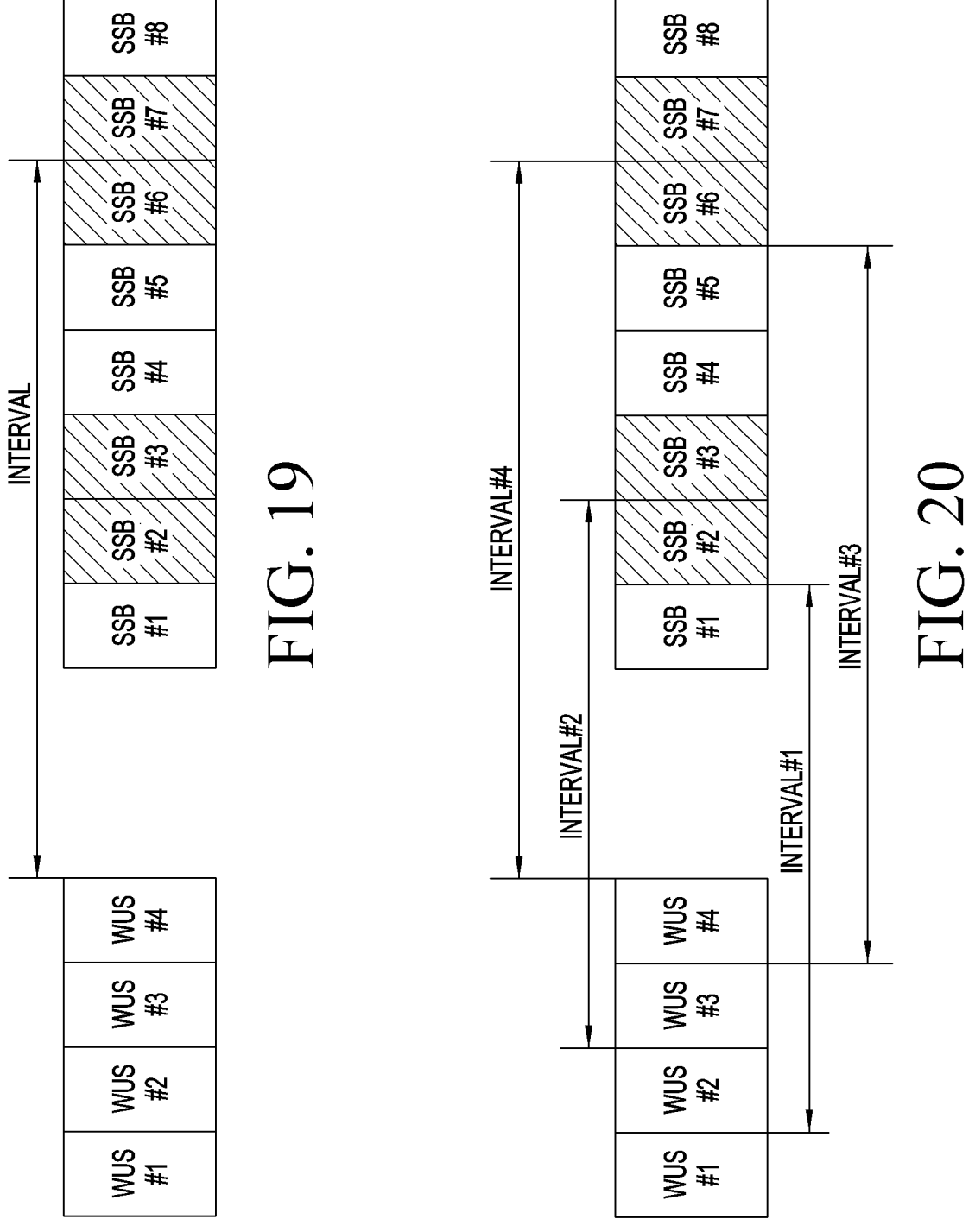
Figure 21:
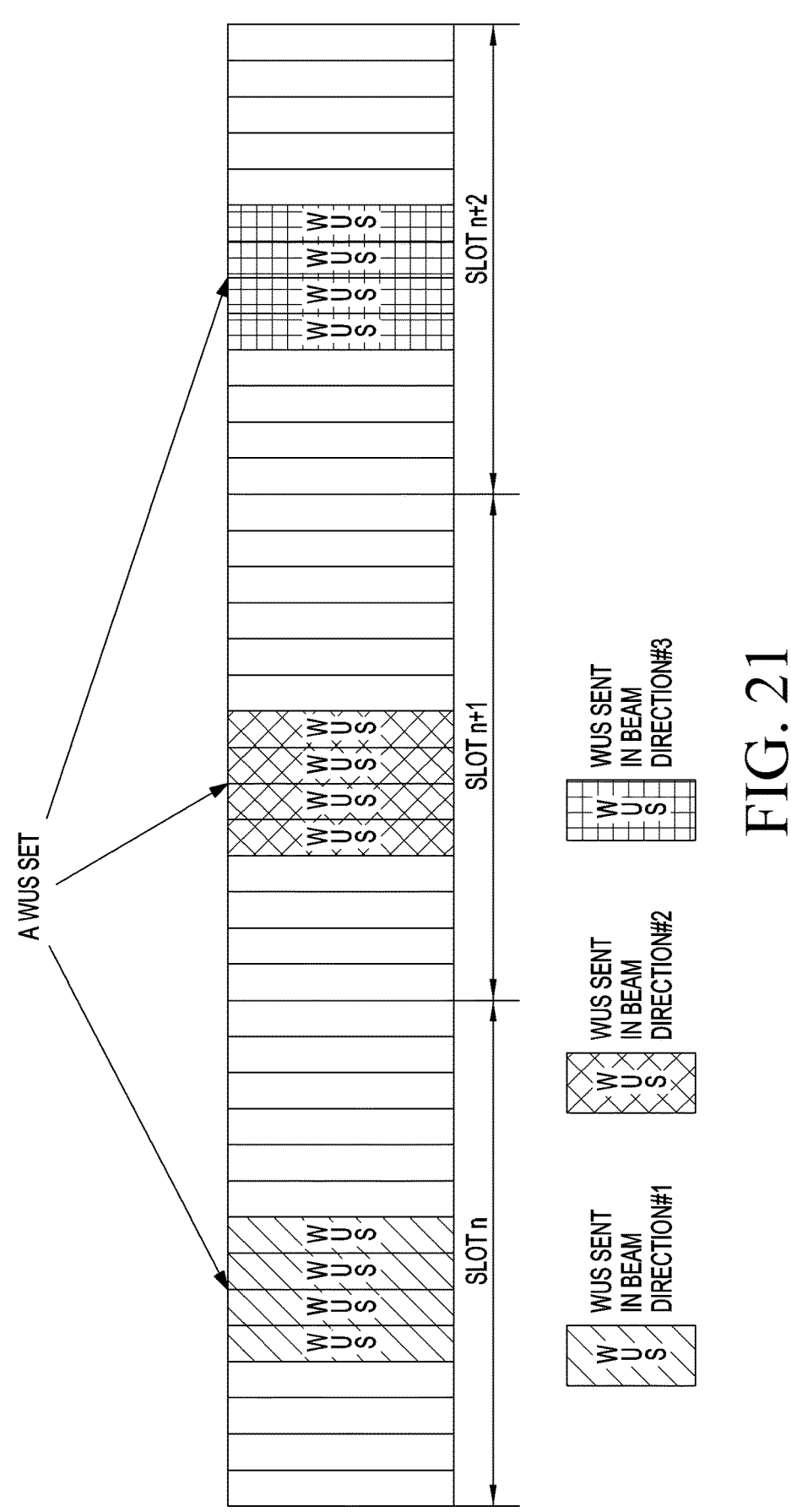
Figure 22:
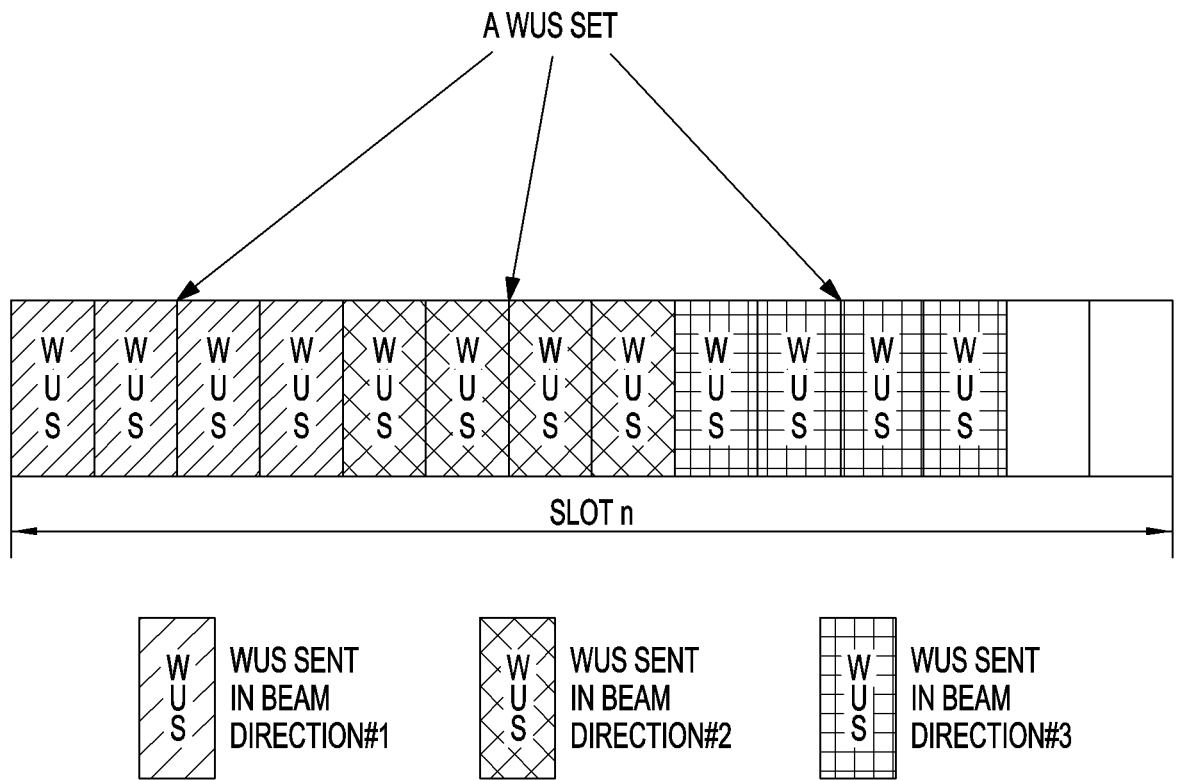
Figure 23:
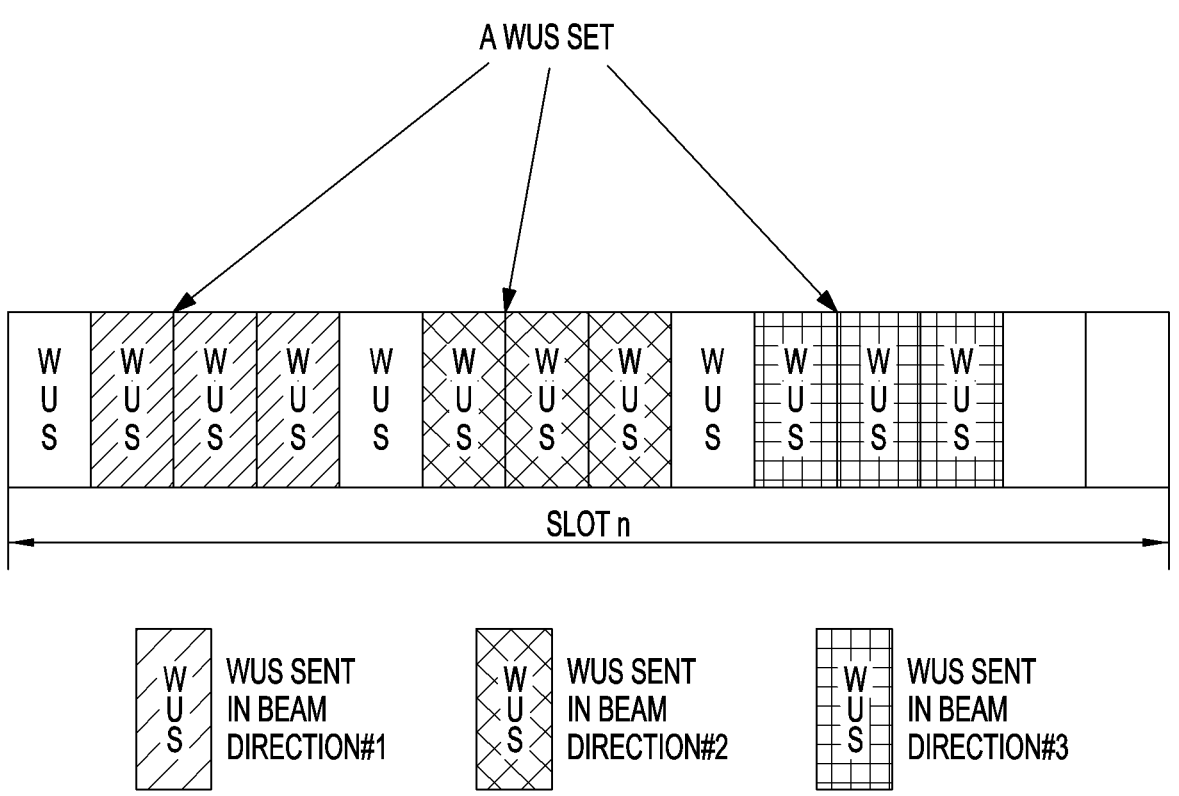
Figure 24:
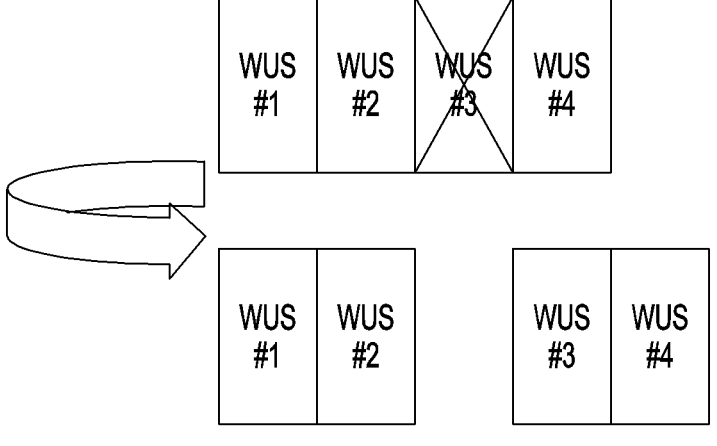
Figure 25:
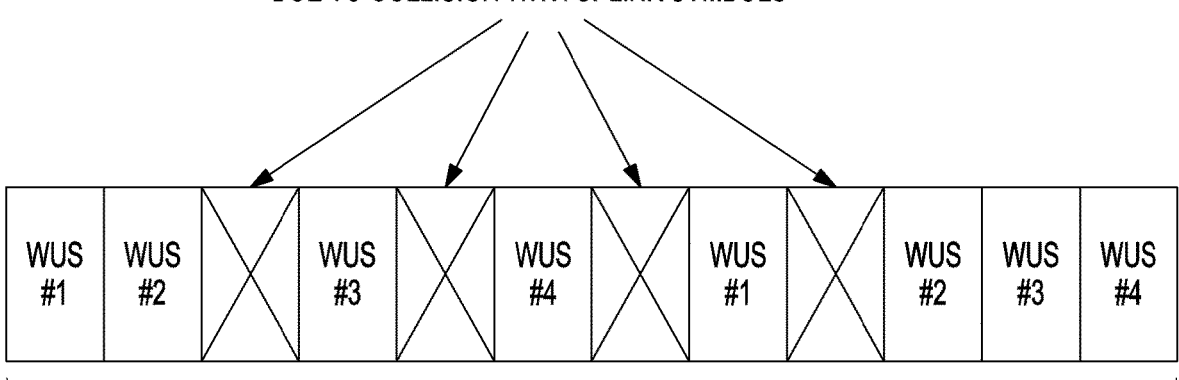
Figure 26:
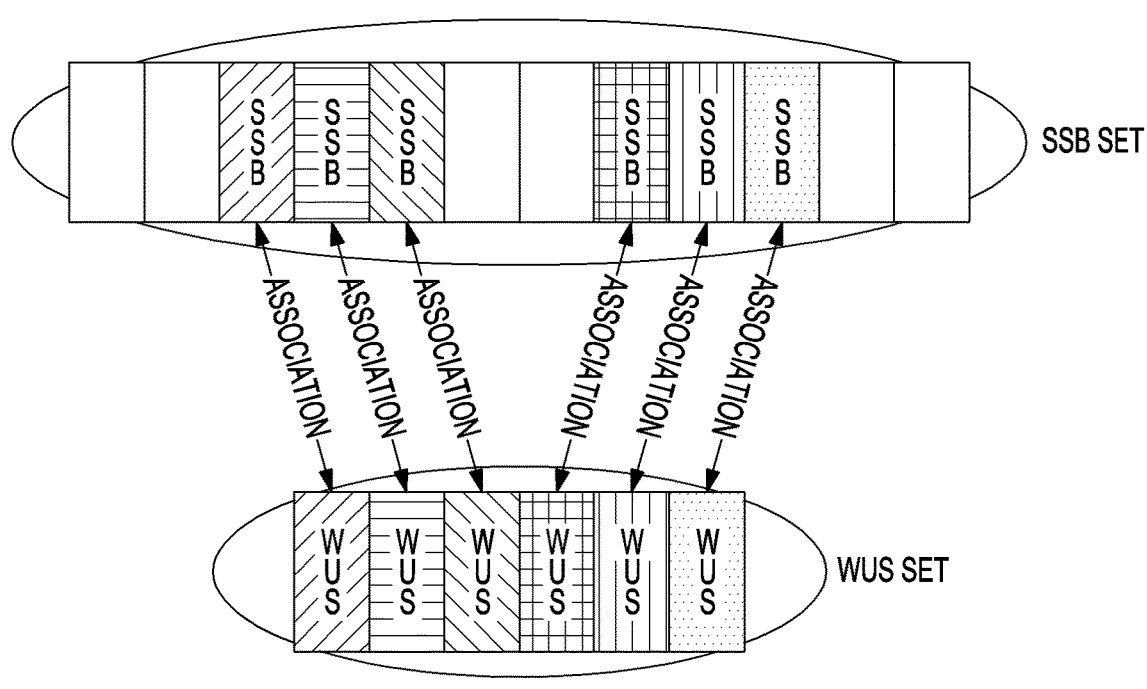
Figure 27:
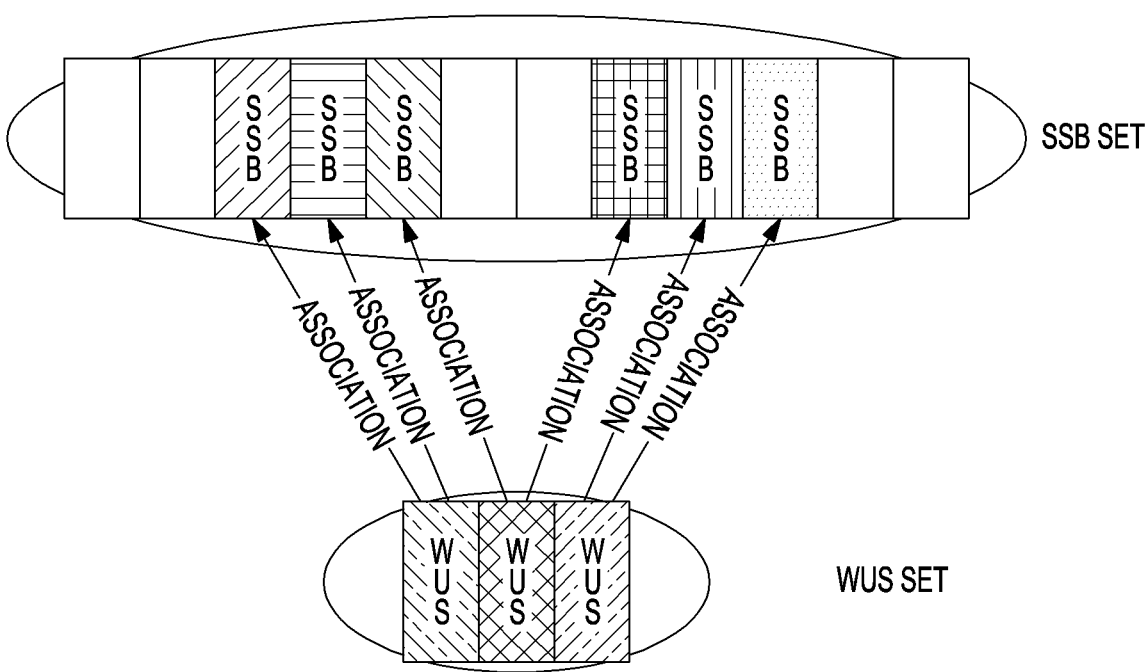
Figure 28:
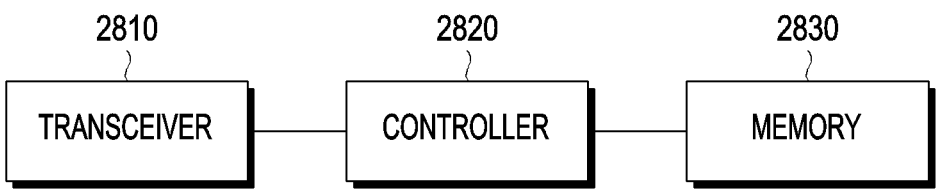

FIG, 14 is a schematic diagram of an interval between an SSB and a PO according to another embodiment;

FIG. 15 is a schematic diagram of an interval between an SSB and a PO according to another embodiment;

FIG. 16 is a schematic diagram of an interval between an SSB and a PO according to another embodiment;

FIG. 17 is a schematic diagram of an interval between a WUS set and a reference SSB burst set according to another embodiment;

FIG. 18 is a schematic diagram of an interval between a WUS set and a reference SSB burst set according to another embodiment;

FIG. 19 is a schematic diagram of an interval between a WUS set and a reference SSB burst set according to another embodiment;

FIG. 20 is a schematic diagram of an interval between a WUS set and a reference SSB burst set according to another embodiment;

FIG. 21 is a schematic diagram of time domain resources used by WUSs with different beam directions in a WUS set according to another embodiment;

FIG. 22 is a schematic diagram of time domain resources used by WUSs with different beam directions in a WUS set according to another embodiment;

FIG. 23 is a schematic diagram of time domain resources used by WUSs with different beam directions in a WUS set according to another embodiment;

FIG. 24 is a schematic diagram of time domain resources used by a WUS set according to another embodiment;

FIG. 25 is a schematic diagram of time domain resources used by a WUS set according to another embodiment;

FIG. 26 is a schematic diagram of relationship between a WUS and an SSB according to another embodiment;

FIG. 27 is a schematic diagram of relationship between a WUS and an SSB according to another embodiment; and FIG. 28 is a block diagram of a UE according to an embodiment.

DETAILED DESCRIPTION

The following description is made with reference to the drawings is provided to facilitate a comprehensive understanding of various embodiments of the present disclosure. The description includes various specific details to facilitate understanding but should only be considered as exemplary. Therefore, those skilled in the art will recognize that various changes and modifications can be made to the various embodiments described herein without departing from the scope and spirit of the present disclosure. In addition, for the sake of clarity and conciseness, the description of well-known functions and structures may be omitted.

It should be understood that singular forms of a, an and the include plural referents, unless the context clearly indicates otherwise. Thus, for example, references to component surfaces include references to one or more such surfaces.

The term including or may include refers to the existence of the corresponding disclosed functions, operations or components that can be used in various embodiments, rather than limiting the existence of one or more additional functions, operations or features. In addition, the term including or having can be interpreted to indicate certain features, numbers, steps, operations, constituent elements, components or combinations thereof, but should not be interpreted to exclude the possibility of the existence of one or more other features, numbers, steps, operations, constituent elements, components or combinations thereof.

Terms or expressions used in various embodiments includes any listed terms and all combinations thereof. For example, A or B may include A, B, or both A and B.

Unless otherwise defined, all terms (including technical terms or scientific terms) used in the disclosure have the same meanings as understood by those skilled in the art as described in the disclosure. Common terms as defined in dictionaries are interpreted to have meanings consistent with the context in relevant technical fields, and they should not be interpreted idealized or excessively formally, unless explicitly defined herein.

Figure 1:
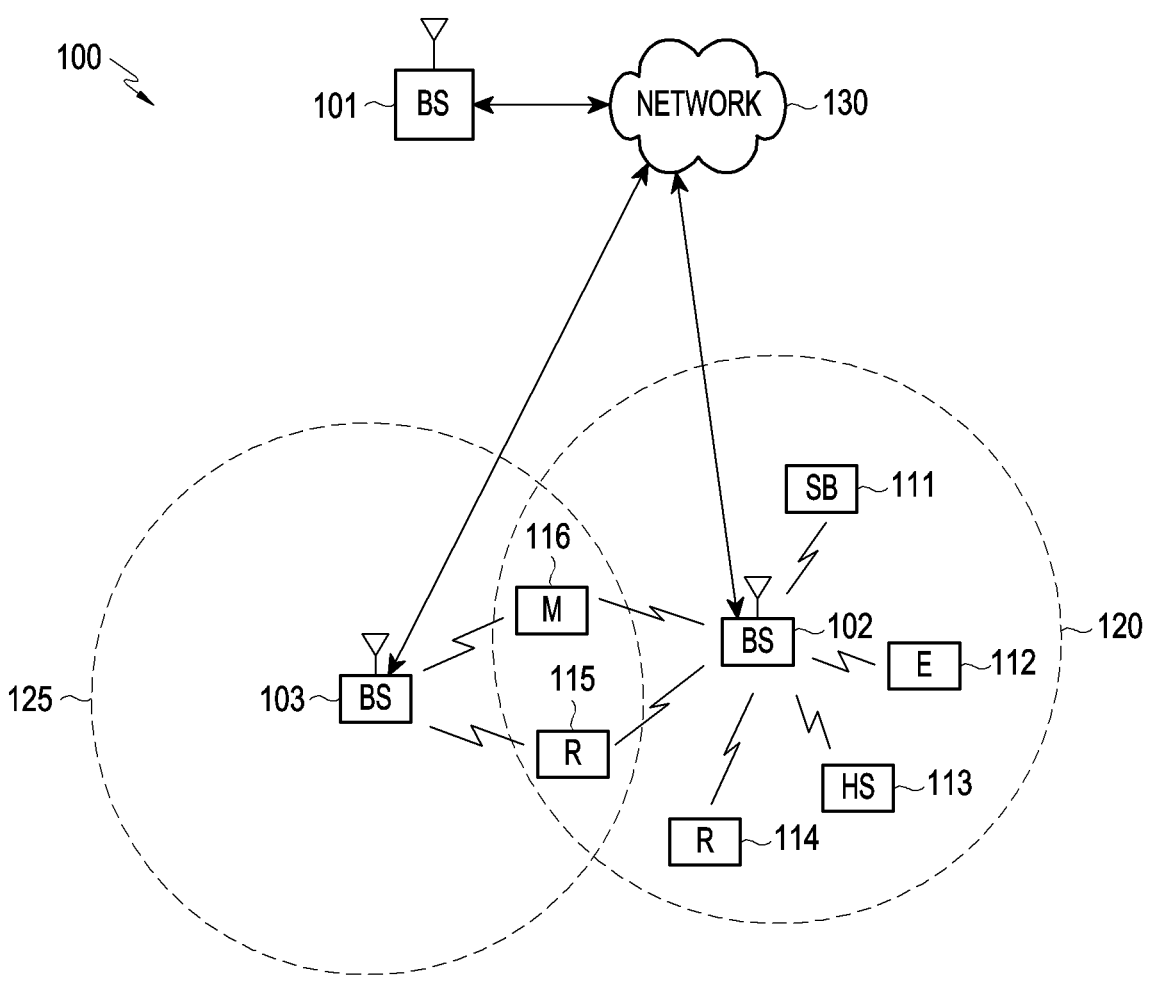
FIG. 1 illustrates a wireless network according to an embodiment.

FIG. 1 illustrates an example wireless network 100 according to an embodiment. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a DNB 103. gNB 101 communicates with gNB 102 and gNB 103. gNB 101 also communicates with at least one Internet protocol (IP) network 130, such as the Internet, a private IP network, or other data networks.

Depending on a type of the network, other well-known terms such as base station (BS) or access point (AP) can be used instead of gNodeB or gNB. For convenience, the terms gNodeB and gNB are used to refer to network infrastructure components that provide wireless access for remote terminals. And, depending on the type of the network, other well-known terms such as mobile station (MS), user station, remote terminal, wireless terminal or user apparatus can be used instead of user equipment or UE. For convenience, the terms user equipment and UE are used to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of UEs within a coverage area 120 of gNB 102. The first plurality of UEs include a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G. LTE, LTE-advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described herein, one or more of gNB 101, gNB 102, and gNB 103 include a 2D antenna array as described in embodiments. In some embodiments, one or more of gNB 101, gNB 102, and gNB 103 support codebook designs and structures for systems with 2D antenna arrays.

Figures 2A, 2B:
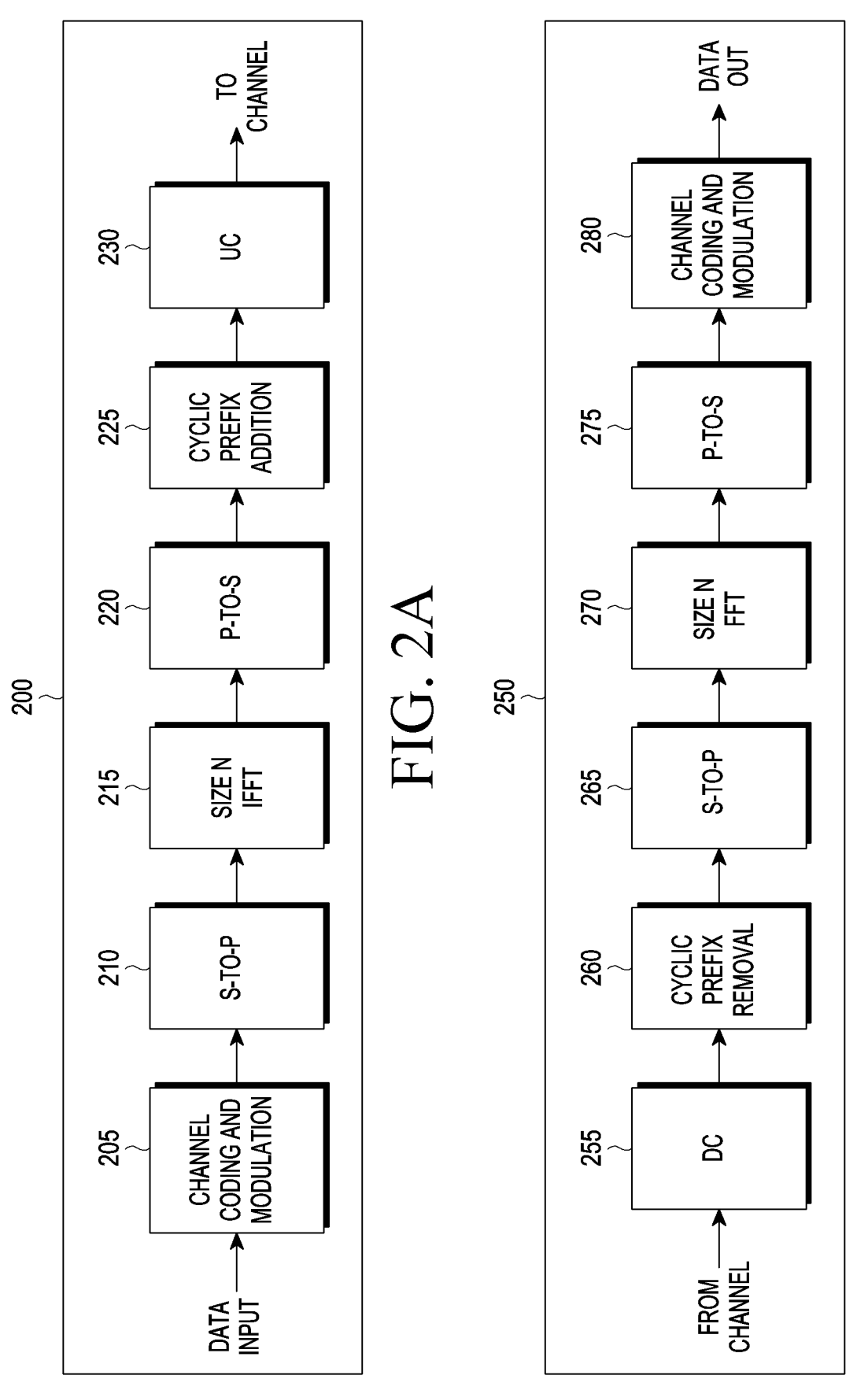
FIG. 2A illustrates a transmission path utilized in an embodiment.
FIG. 2B illustrates a reception path utilized in an embodiment.

Although FIG. 1 illustrates an example of the wireless network 100, various changes can be made to FIG. 1. The wireless network 100 can include any number of gNBs and any number of UEs in any suitable arrangement, for example. Further, gNB 101 can directly communicate with any number of UEs and provide wireless broadband access to the network 130 for those UEs. Similarly, each gNB 102-103 can directly communicate with the network 130 and provide direct wireless broadband access to the network 130 for the -Us. In addition, gNB 101, gNB 102 and/or gNB 103 can provide access to other or additional external networks, such as external telephone networks or other types of data networks. FIG. 2A illustrates a transmission path utilized in an embodiment. FIG. 2B illustrates a reception path utilized in an embodiment.

In FIGS. 2A and 2B, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, an S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding (such as low density arity check (LDPC) coding), and modulates the input bits (such as using quadrature phase shift keying (QPSK) or quadrature amplitude modulation (QAM)) to generate a sequence of frequency-domain modulated symbols. The S-to-P block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The P-to-S block 220 converts (such as multiplexes) parallel time-domain output symbols from the size N IFFT block 215 to generate a serial time-domain signal, The cyclic prefix addition block 225 inserts a cyclic prefix into the time-domain signal. The UC 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The DC 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Further, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for ITT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Further, FIGS. 2A and 2B illustrate examples of types of transmission and reception paths that can be used in a wireless network, and other suitable architectures can be used to support wireless communication in a wireless network.

Figure 3A:
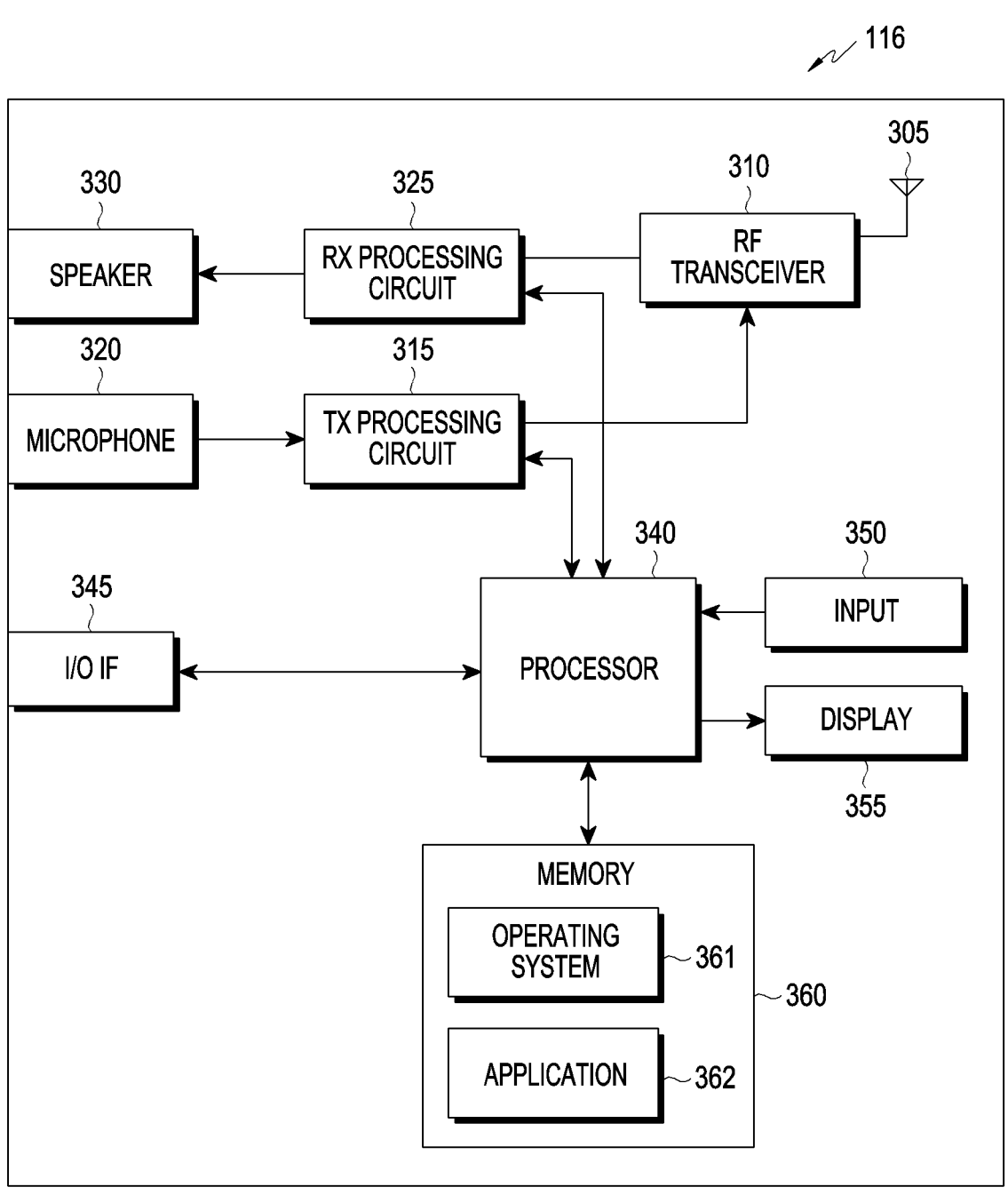
FIG. 3A is a block diagram of a UE according to an embodiment.

FIG. 3A is a block diagram of a UE according to an embodiment. FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of LE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in various embodiments. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in HG. 3A can be combined, further subdivided or omitted, and additional components can be added according to specific requirements. As a specific example, the processor/controller 340 can be divided into multiple processors, such as one or more central processing units (CPUs) and one or more graphics processing units (GPUs). Although FIG. 3A illustrates that the HE 116 is configured as a mobile phone or a smart phone, Ues can be configured to operate as other types of mobile or fixed devices.

Figure 3B:
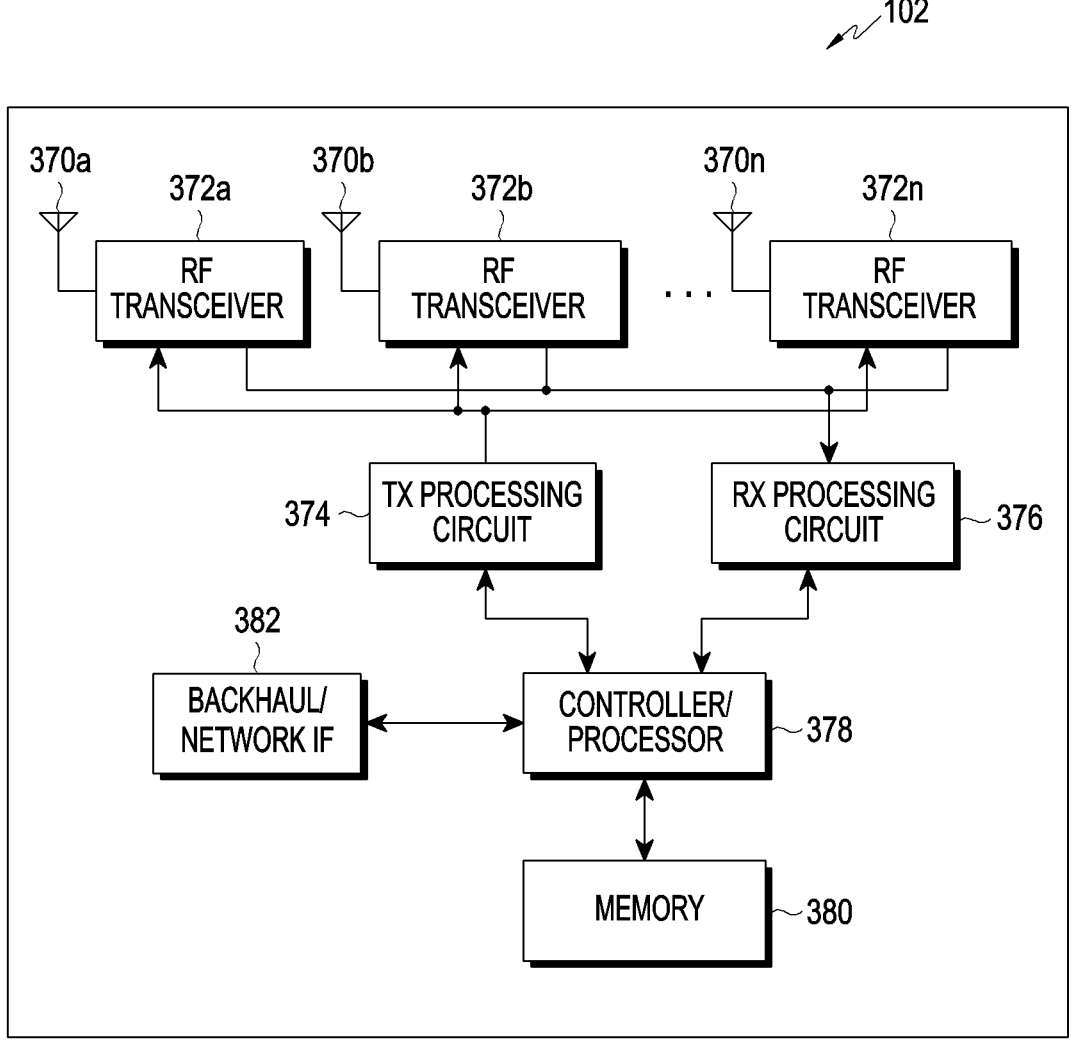
FIG. 3B is a block diagram of a base station according to an embodiment.

FIG. 3B is a block diagram of a base station according to an embodiment. FIG. 3B illustrates an example gNB 102 according to the present disclosure. The embodiment of gNB 102. shown in FIG. 3B is for illustration only, and other gNBs of FIG. 1 can have the same or similar configuration. However, a gNB has various configurations, and. FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes multiple antennas 370a, 370h . . . 370n, multiple RF transceivers 372a372n, a TX processing circuit 374, and an RX processing circuit 376. In certain embodiments, one or more of the multiple antennas 370a, 370b . . . , 370n include a 2D antenna array. gNB 102 also includes a controller/processor 378, a memory 380, and a backhaul or network interface 382.

RF transceivers 372a-372n receive an incoming RE, signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal, RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or signal into an RE signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web real-time communications (RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or new radio (NR), LTE or LTE-A, the backhaul or network interface 382 can allow gNB 102 to communicate with other gNBs through wired or wireless backhaul connections. When gNB 102 is implemented as an AP, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other read only memories (ROMs). In certain embodiments, multiple instructions, such as the BIS algorithm, are stored in the memory. The plurality of instructions are configured to cause the controller/processor 378 to execute the BIS process and decode the received signal after subtracting at least one interference signal determined by the BIS algorithm.

As described herein, the transmission and reception paths of gNB 102 (implemented using RF transceivers 372a-372n, TX processing circuit 374 and/or RX processing circuit 376) support aggregated communication with frequency division duplex (FDD) cells and time division duplex (TDD) cells.

Although FIG. 3B illustrates an example of gNB 102, various changes may be made to FIG. 3B. For example, gNB 102 can include any number of each component shown in FIG. 3A. As a specific example, the AP can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Power saving technology has always been an important design goal of a communication system, especially on the UE side, In the 5G communication system, an important power-saving technology is the discontinuous reception (DRX) technology. For example, in an RRC idle state, a receiver of a UE can be in a deep sleep status for the most of the time, and only needs to periodically wake up to monitor paging messages and to periodically perform cell measurement. Actually, no paging message would be monitored by the UE in most POs, and there are only a few POs in which a paging message can be monitored by the UE. If the network can inform the UE to monitor the paging message only in some POs through a WUS, and the UE can monitor the WUS through a low-power wake-up receiver (WUR), then power consumption of the UE can be significantly saved. Thus, provided herein is a design scheme for the low-power WUS and WUR.

Function of WUS

Figure 4:
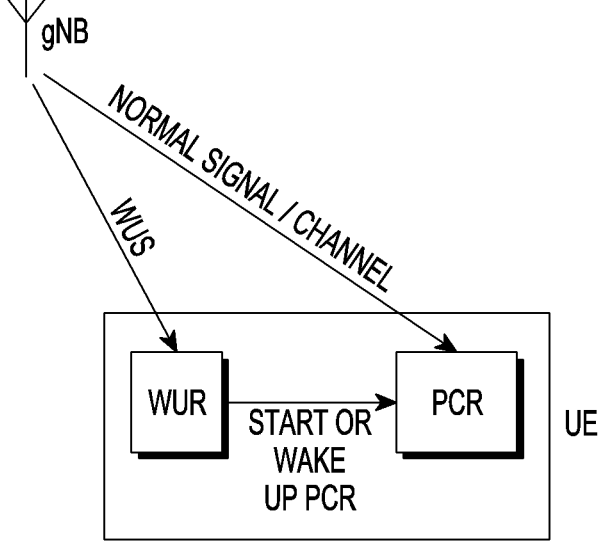
FIG. 4 is a schematic diagram of a function of a wake-up signal (WUS) according to an embodiment.

FIG. 4 is a schematic diagram of a function of a WUS according to an embodiment. The UE in RRC non-connected mode periodically monitors the WUS, and the UE monitors the WUS in a low-power way with a dedicated receiver different from a primary connection receiver (PCR). The above RRC non-connected mode includes an idle state and/or an in-active state. The receiver used to monitor the WUS is referred to as a wake up receiver (WUR). The WUR is only used to receive the WUS, and cannot receive other signals/channels. The PCR can be understood as the existing receiver of the UE, that is, it receives all signals/channels used for network connection and data transmission. The WUS is used to wake up the UE. For example, waking up the UE includes starting or waking up the PCR. That is, the UE in a RRC idle/inactive state starts WUR to monitor the WUS in a low power mode, and starts PCR or wakes up the PCR from a deep sleep status to monitor a PO only after the UE monitors the WUS, thus achieving the purpose of power saving.

In an alternative scheme, a WUS is used to trigger start of the PCR, that is, a UE in a RRC idle/inactive: state can turn off the PCR, only starts the WUR to monitor a WUS, and the UE needs to start the PCR after a WUS is monitored. After the PCR is turned off, the PCR does not need to receive any signal/channel, that is, the UE neither needs to monitor the PO, nor needs to perform cell measurement. After the PCR is started, the UE needs to monitor a paging occasion. If the UE does not monitor a paging message, or a paging message does not trigger any downlink receiving behavior even if the paging message is monitored, the PCR can be turned off.

Alternatively, after the PCR is started, the UE needs to monitor a paging occasion and perform cell measurement. If the UE does not monitor a paging message, or a paging message does not trigger any downlink receiving behavior even if the paging message is monitored, and after the cell measurement is completed, the PCR can be turned off.

In another alternative scheme, the WUS is used to trigger wake-up of the PCR. That is, a UE in a RRC idle/inactive mode can set the PCR to a deep sleep status and start the WUR to monitor a WUS. The UE needs to wake up the PCR from the deep sleep status after a WUS is monitored. After the PCR is set to the deep sleep status, the UE, does not need to monitor a paging occasion, but only needs to perform cell measurement regularly. After the PCR is waken up from the deep sleep status, the UE needs to monitor the paging occasion. If the UE does not monitor a paging message, or a paging message does not trigger any downlink receiving behavior even if the paging message is monitored, the PCR can return to the deep sleep status.

In the above two alternative schemes, the difference between turn-off and deep sleep of the PCR lies in whether the UE should perform cell measurement, and the purpose of cell measurement is to deal with the mobility of the terminal. For a case in which a UE is almost quasi-stationary, that is, the mobile range of the IE is very small, and the UE hardly leaves the resident cell, then such UE may not perform cell measurement for the purpose of saving power. Thus, the PCR can be completely turned off, and the UE can report to the network whether it has quasi-stationary characteristic and/or whether the PCR can be completely turned off. The system supports two kinds of UEs: 1) a UE that can completely turn off the PCR, with the UE not performing cell measurement during turn-off of the PCR; and 2) a UE that can set the PCR to the deep sleep status, with the UE needing to perform cell measurement regularly during the deep sleep of the PCR. The base station can configure respective WUSs for the two kinds of UEs, and the UE determines the corresponding WUS according to the reported information.

Figure 5:
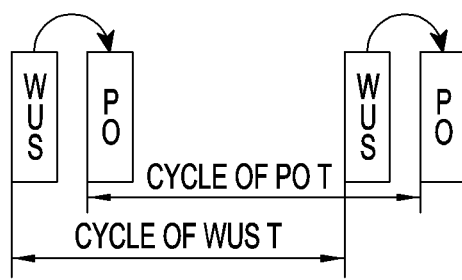
FIG. 5 is a schematic diagram of a function of a WUS according to another embodiment.

Based on the above two alternative schemes, the WUS can have at least one of:

1) the WUS is used to instruct the UE to start the PCR or wake up the PCR from the deep sleep to monitor a PO in a cycle. That is, the PO in each cycle is associated with a WUS, and the UE monitors the WUS corresponding to each PO based on a cycle T, where the cycle T is also the PO monitoring cycle of the UE, i.e., the paging cycle, as shown in FIG. 5. FIG. 5 is a schematic diagram of a function of a WUS according to another embodiment of the present disclosure. The advantage of the design of FIG. 5 allows the UE to decide whether to monitor a PO based on monitoring result of the WUS in every paging cycle, to save power.

Figure 6:
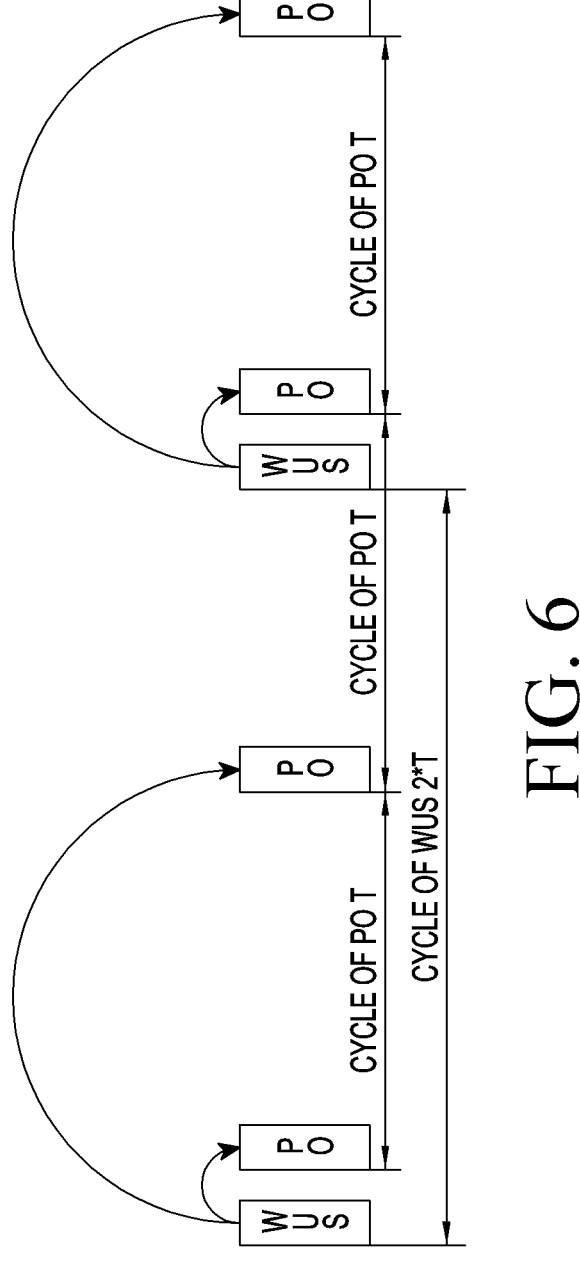
FIG. 6 is a schematic diagram of a function of a WUS according to another embodiment.

2) the WUS is used to instruct a UE to start the PCR or wake up the PCR from the deep sleep mode to monitor POs in multiple consecutive cycles. That is, every Num)PO of the POs is associated with one WUS, and the UE monitors the NUS corresponding to every Num_ PO of the POs based on a cycle of Num_PO*T, where the cycle T is the PO monitoring cycle of the UE. Num_PO is a positive integer, and the value of Num_PO can be configured by network. For example, the Num_PO can be indicated by system information. FIG. 6 is a schematic diagram of a function of a WUS according to another embodiment. In the embodiment of FIG. 6, the UE monitors a WUS corresponding to every 2 POs based on a cycle 2*T. The embodiment of FIG. 6 has the advantage of further reducing the frequency and overall power consumption for the UE monitoring the WUS, and also reducing the resource overhead of the WUS.

Figure 7:
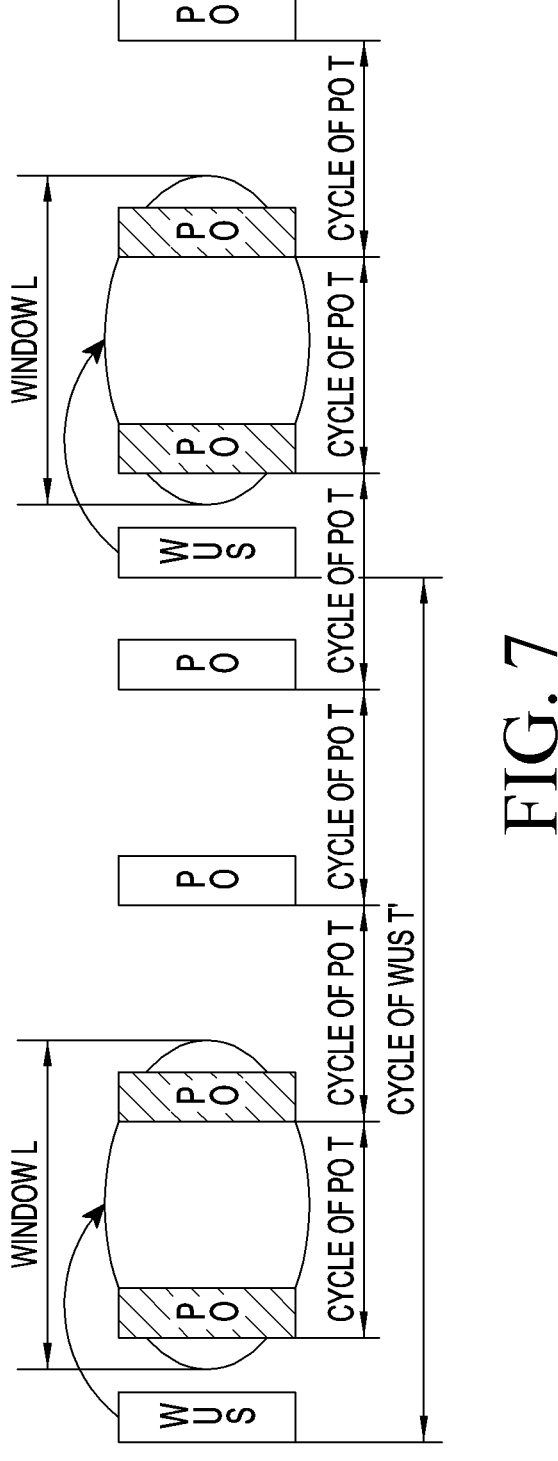
FIG. 7 is a schematic diagram of a function of a WUS according to another embodiment.

3) the WUS is used to instruct the UE to start the PCR or wake up the PCR from the deep sleep mode to monitor a PO within a time window after the WUS. Here, there is no relation between a monitoring cycle (T') of the WUS and a monitoring cycle (T) of the PO, and the start point of the time window is determined by the time domain location of the WUS. For example, the start point of the time window is the first radio frame, slot or symbol after the preset interval from the WUS. The length L of the time window may be equal to or less than the monitoring cycle T' of the WUS. The UE determines whether to monitor the PO within the window according to indication information of the WUS, and the UE does not need to monitor the PO outside the window, as shown in FIG. 7. FIG. 7 is a schematic diagram of a function of a WUS according to another embodiment. Alternatively, the monitoring cycle T' of the WUS can be configured as an integer multiple of the cycle of the PO, and the length L of the time window can also be configured as an integer multiple of the cycle of the PO. The advantage of the design of FIG. 7 is that the UE can decide whether to monitor a part of POs according to monitoring result of the WUS, without monitoring another part of POs, to further save power.

If the UE has uplink data to be sent, then the UE needs to establish a connection with the network to transmit data. In the process, the UE needs to start or wake up the PCR to perform the corresponding downlink reception and uplink transmission.

In addition, whether the UE can monitor a WUS depends on UE capability, and the UE needs to report to the network whether it has the capability to monitor a WUS. That is, whether UE capability exists to monitor a WUS needs to be defined. The advantage of reporting the UE capability is that the network can determine whether to configure a WUS according to the number of UEs with WUS monitoring capability. In the terminal implementation, the UE can monitor the WUS through a separate WUR module, or it is possible that the UE does not have a separate WUR module, but monitors the WUS through the PCR module in a low power way, so the WUS capability about the UE can include at least one of:

1) the UE has a separate WUR module, and can use the WUR module to monitor a WUS;

2) the UE has no separate WUR module, and can use the PCR module to monitor a WUS; and 3) the UE has no separate WUR module, and the PCR module does not have the capability to monitor a WUS.

Configuration of WUS

In an alternative scheme, the base station configures the WUS through UE-specific RRC signaling. For example, the base station provides various configuration information on the WUS in an RRC Release message. For example, the configuration information can indicate, hut is not limited to, at least one of the time domain location and frequency domain location of the WUS, for monitoring the WUS in the RRC idle state or inactive state by the UE.

In another alternative scheme, the base station configures a WUS through the system information. As a PO is monitored by a group of UEs, and a WUS is also monitored by a group of UEs, that is, the UEs with WUS capability among the UEs monitoring the same PO monitor the same WUS, a PO can correspond to a WUS, or every Num_PO of the POs can correspond to a WUS.

To reduce the probability of a UE being ineffectively waken up, UEs monitoring the same PO can be further grouped. For example, based on the identities of the UEs, such as temporary mobile subscriber identity (TMSI) numbers, the UEs are grouped, and different UE groups monitor different WUSs. To be distinguished from the situation where each PO or every Num_PO of the POs correspond to on WUS, the WUS herein is referred to as grouping WUS (GWUS), that is, a PO or Num_PO of the POs correspond to multiple GWUSs, each GWUS is monitored by a group of UEs among UEs monitoring the PO(s), and multiple GWUSs can be multiplexed by time division, frequency division and/or code division. The UE determines its own group according to its own TMST number, to monitor the GWUS of the corresponding group.

Time Domain Location of WUS

Figure 8:
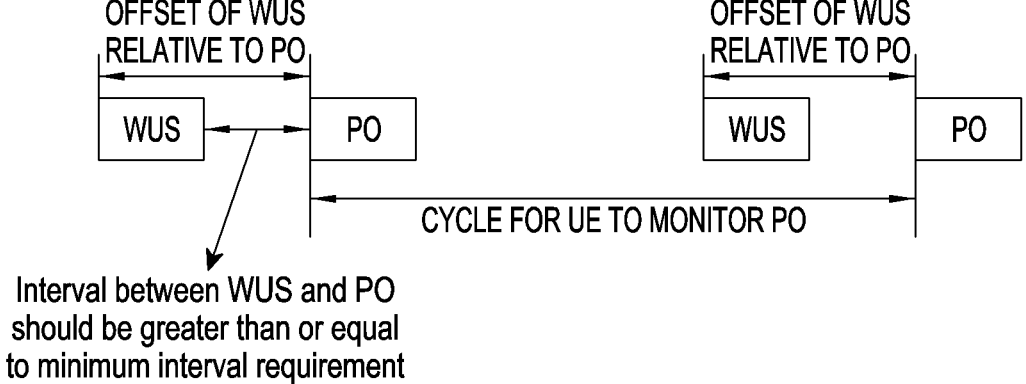
FIG. 8 is a schematic diagram of a time domain location of a WUS according to another embodiment.

FIG. 8 is a schematic diagram of a time domain location of a WUS according to another embodiment. In an alternative scheme, as illustrated in FIG. 8, the time domain location of the WUS is associated with the time domain location of a PO. For example, the base station indicates the time domain location of the WUS by indicating an offset of the WUS relative to the PO. For the situation where a WUS is associated with every Num_PO of the POs, the base station indicates the offset of the WUS relative to the first PO among the Num_PO of the POs. In other words, the IE determines the time domain location of the WUS according to the time domain location of the PO and the offset indicated by the base station. Particularly, the WUS precedes the associated PO. That is, the WUS is at the position that satisfies the offset before the PO. It should be understood that the offset mentioned herein can indicate the distance between the start point of a time domain resource and the start point of another time domain resource, but the offset of the present disclosure is not limited to it, and the offset can also indicate the distance between the end point of a time domain resource and the end point of another time domain resource, or any other type of distance that can characterize the offset.

An indication granularity of the offset between a WUS and a PO may be a radio frame, a slot, or a symbol. The offset in the granularity of a radio frame is the offset of the radio frame where the start point of the wake-up signal is located relative to the radio frame where a reference point (for example, the time domain location of the above-mentioned paging occasion or a reference SSB burst set, as described herein) is located, the offset in the granularity of a slot is the offset of the slot where the start point of the wake-up signal is located relative to the slot where the reference point is located, and the offset in the granularity of a symbol is the offset of the start symbol of the wake-up signal relative to the start symbol the reference point.

Taking the granularity of the slot as an example, the offset between a WUS and a PO is the offset between the slot where the start point of the WUS is located and the slot where a first physical downlink control channel (PDCCH) monitoring occasion corresponding to the PO is located. For a high-frequency scenario, the WUS is a set containing multiple WUSs. For example, a WUS set includes multiple WUSs associated with multiple SSBs, or the WUS set includes multiple WUSs with different beam directions. The offset between a WUS set and a PO is the offset between the slot where the first WUS in the WUS set is located and the slot where the first PDCCH monitoring occasion corresponding to the PO is located, or the offset of the slot where each WUS in the WUS set is located relative to the first PDCCH monitoring occasion corresponding to the PO, or the offset of each WUS in the WUS set relative to the first PDCCH monitoring occasion associated with the same SSB corresponding to the PO.

Figure 9:
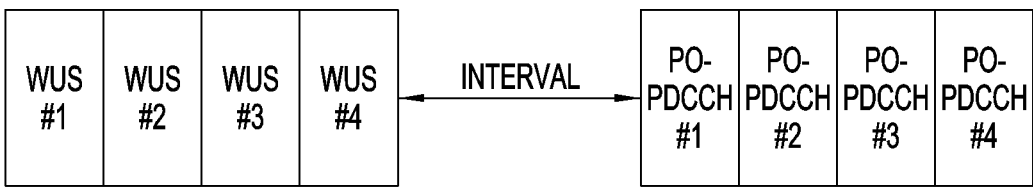
FIG. 9 is a schematic diagram of an interval between a WUS set and a paging occasion (PO) according to another embodiment.
Figure 10:
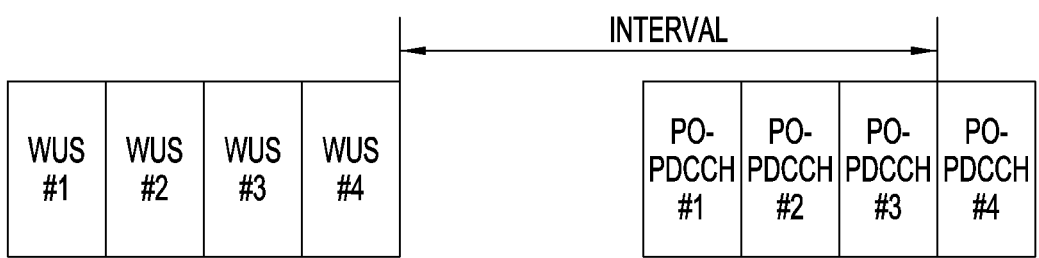
FIG. 10 is a schematic diagram of an interval between a WUS set and a PO according to another embodiment.
Figure 11:
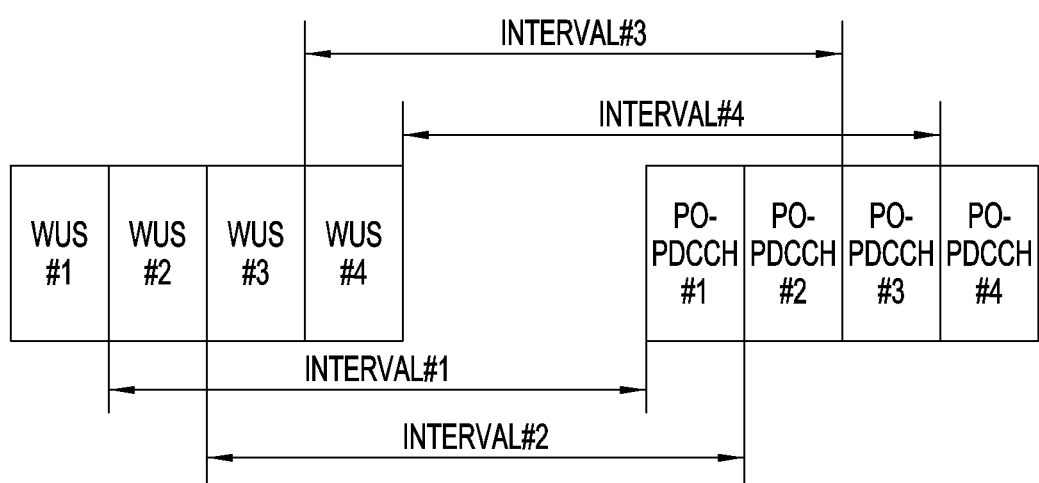
FIG. 11 is a schematic diagram of an interval between a WUS set and a PO according to another embodiment.

In addition, referring to FIG. 8, the interval between a WUS and a PO should meet the requirement of a minimum interval, and the minimum interval should reserve the processing time for a UE to start or wake up the PCR and be ready to monitor the PO after receiving the WUS, including, for example, the processing time for start or wake-up of hardware and software, downlink synchronization, etc. It should be understood that the interval mentioned herein can indicate the distance between the end point of a time domain resource and the start point of another time domain resource, but the interval in the present disclosure is not limited to it, and the interval can also indicate the distance between a specific location in a time domain resource and a specific location in another time domain resource, or any other type of distance that can characterize an interval. The interval between the WUS and the PO is the interval between the end point of the WUS and the first PDCCH monitoring occasion corresponding to the PO. For a high-frequency scenario, the WUS is a set containing WUSs with different beam directions, and the interval between the WUS set and the PO is at least one of:

The interval between the last WUS of the WUS set and the first PDCCH monitoring occasion corresponding to the PO, as illustrated in FIG. 9. with FIG. 9 being a schematic diagram of an interval between a WUS set and a PO according to another embodiment;

The interval between the last WUS of the WUS set and the PDCCH monitoring occasions in the same beam direction (that is, corresponding to the same SSB index) corresponding to the PO, as illustrated in FIG. 10, with FIG. 10 being a schematic diagram of an interval between a WUS set and a PO according to another embodiment;

The interval between the kth. WUS of the WUS set and the corresponding kth PDCCH monitoring occasion, where $1 \leq k \leq Num\_Beam$, and Num_Beam is the total number of actually sent SSBs contained in the SSB burst set. That is, the interval between the WUS in each beam direction and the first PDCCH monitoring occasion corresponding to the same beam direction (i.e., corresponding to the same SSB index) should meet the minimum interval requirement, as illustrated in FIG. 11, with FIG. 11 being a schematic diagram of an interval between a WUS set and a PO according to another embodiment.

UEs with different capabilities can support different values of the minimum interval between the WUS and the PO. The system can define at least two kinds of UE capabilities of minimum intervals. A UE should report minimum interval capability supported by the UE to the network. The base station can configure at least two WUSs, and different WUSs have different offsets relative to the same PO, that is, intervals between different WUSs and a PO are different. The UE monitors the corresponding WUS according to the reported minimum interval, that is, the interval between the WUS monitored by the UE and the PO should be greater than or equal to the minimum interval reported by the UE. If there are many WUSs that meet the minimum interval capability reported by the UE, then the UE monitors the WUS with the smallest interval from the PO among those WUSs.

Figure 12:
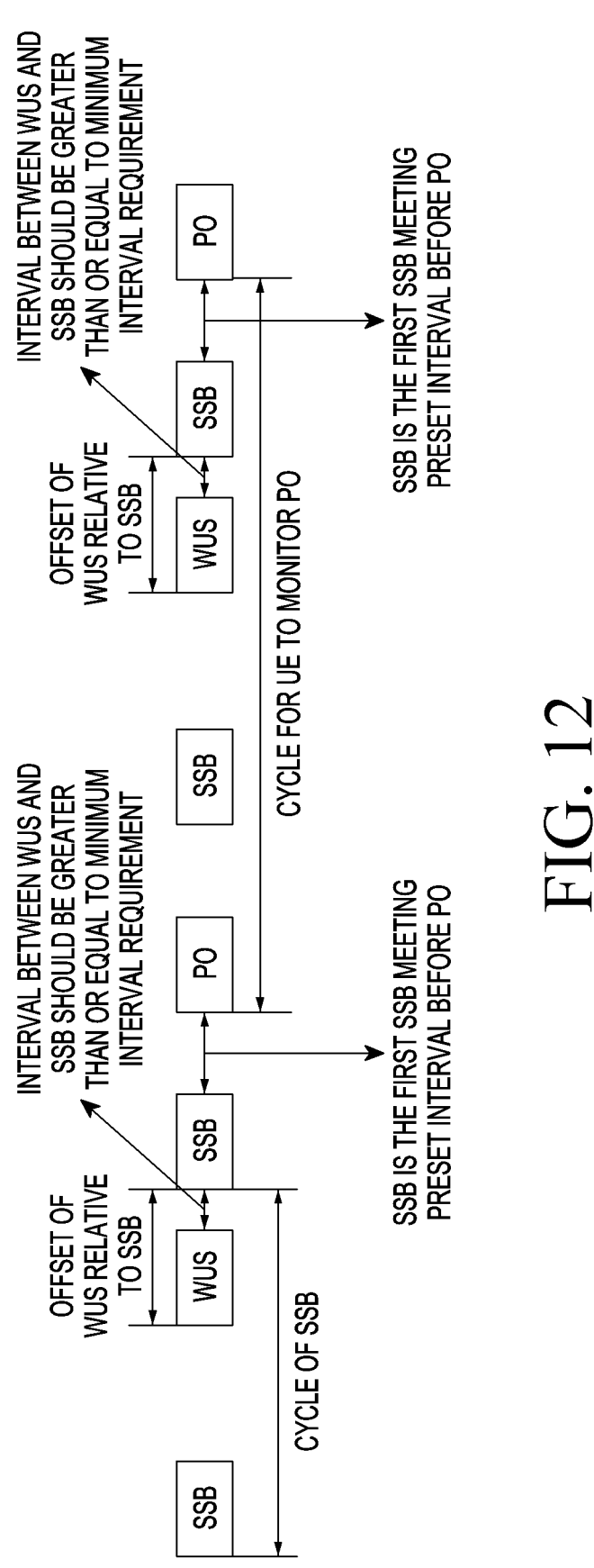
FIG. 12 is a schematic diagram of a time domain location of a WUS according to another embodiment.

In yet another alternative scheme, the time domain location of a WUS is associated with the time domain location of the nearest SSB set before a PO, and the SSB burst set used to determine the time domain location of the WUS is called the reference SSB burst set. An SSB burst set contains multiple SSBs with different beam directions. For example, the base station indicates the time domain location of a WUS by indicating the offset of the WUS relative to the nearest SSB burst set before the PO. For the case where every Num_PO of the POs are associated with a WUS, it is indicated that the offset of the WUS relative to the nearest SSB burst set before the first PO in the Num_PO of the POs. In other words, the UE determines the time domain location of the WUS according to the time domain location of the nearest SSB burst set before the PO and the offset indicated by the base station. Particularly, the WUS is before the SSB, that is, the WUS is at the location that satisfies the offset before the SSB, as illustrated in FIG. 12, with FIG. 12 being a schematic diagram of a time domain location of a WUS according to another embodiment.

The indication granularity of the offset between the WUS and the reference SSB burst set can be a radio frame or a slot or a symbol, Taking the granularity of the slot as an example, the offset between the WUS and the reference SSB burst set is the offset between the slot where the start point of the WUS is located and the slot where the first SSB or the first actually sent SSB in the reference SSB burst set is located, For a high frequency scenario, a WUS is a set of WUSs with different beam directions. The offset between the WUS set and the reference SSB burst set is the offset between the slot where the first WUS of the WUS set is located and the slot where the first SSB or the first actually sent SSB in the reference SSB burst set is located, or the offset of each WUS in the WUS set relative to the first SSB or the first actually sent SSB in the reference SSB burst set, or the offset of each WUS in the WUS set relative to the SSBs with the same beam direction in the reference SSB burst set.

Figures 13, 14:
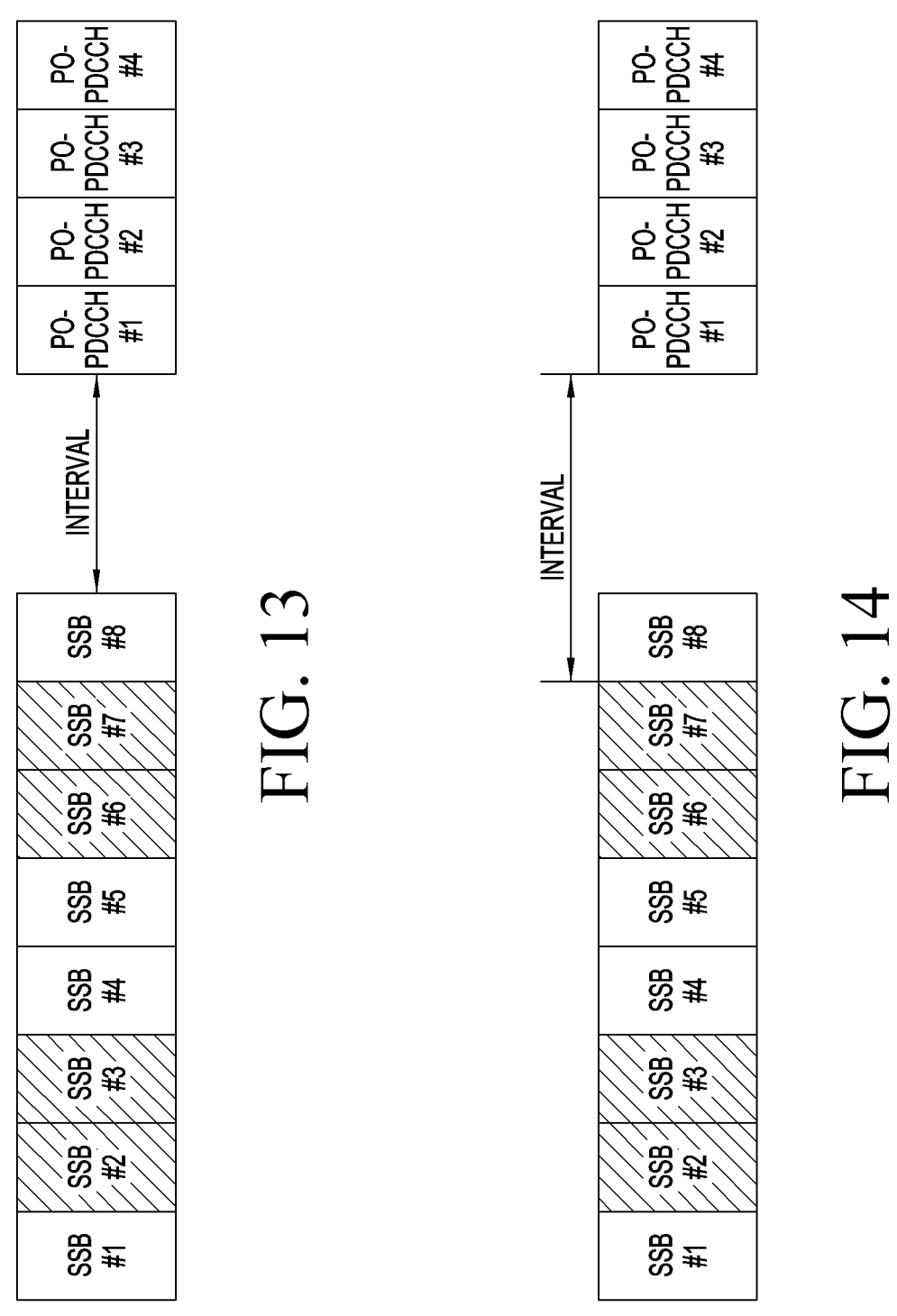
FIG. 13 is a schematic diagram of an interval between a synchronization signal block (SSB) and a PO according to another embodiment.

Compared with the method of indicating the time domain location of the WUS based on the location of the PO, the method of indicating the time domain location of the WUS based on the location of the reference SSB is more suitable for the situation where the PCR is completely turned off, because after a UE monitors the WUS and starts the PCR, the PCR must first receive the SSB to obtain downlink synchronization, to be ready for monitoring the PO, and then monitor the PO. Considering that the UE needs a certain synchronization time after receiving the SSB, the more explicit expression of "the nearest SSB burst set before the PO" in the above scheme should be "the nearest SSB burst set before the PO that satisfies the preset interval", where the interval between the SSB and the PO is at least one of:

the interval between the last SSB of the SSB burst set and the first scheduled PDCCH monitoring occasion corresponding to the PO, as illustrated in FIG, 13, with FIG. 13 being a schematic diagram of an interval between an SSB and a PO according to another embodiment. The shaded parts of FIG. 13 indicate actually sent SSBs;

the interval between the last SSB actually sent in the SSB burst set and the first scheduled PDCCH monitoring occasion corresponding to the PO, as illustrated in FIG. 14, with FIG. 14 being a schematic diagram of an interval between an SSB and a PO according to another embodiment. The shaded parts of FIG. 14 indicate actually sent SSBs;

the interval between the last actually sent SSB in the SSB burst set and the first PDCCH monitoring occasion in the same beam direction corresponding to the PO, as illustrated in FIG. 15, with FIG. 15 being a schematic diagram of an interval between an SSB and a PO according to another embodiment. In FIG. 15, the shaded parts indicate actually sent SSBs;

the interval between the kth actually sent SSB in the SSB burst set and the kth scheduled. PDCCH monitoring occasion corresponding to the PO, where 1≤k≤Num_Beam, and Num_Beam is the total number of actually sent SSBs contained in the SSB burst set, that is, the interval between each actually sent SSB and the first PDCCH monitoring occasion corresponding to the same beam direction should meet the minimum interval requirement, as illustrated in FIG. 16, with FIG. 16 being a schematic diagram of an interval between an SSB and a PO according to another embodiment, in which the shaded part indicates the actually sent SSBs.

UEs with different capabilities can support different values of minimum interval between the reference SSB burst set and the PO for determining the WUS location, the system can define at least two kinds of UE capabilities of the minimum interval between the reference SSB burst set and the a PO for determining the WUS location, and the UE should report to the network capability of the minimum interval between the reference SSB burst sets and an PO for determining a WUS location supported by the UE.

In another alternative scheme, the time domain location of the WUS is associated with the time domain location of the nearest S-th SSB burst set before the PO. For example, the base station indicates the time domain location of the WUS by indicating the offset of the WUS relative to the nearest S-th SSB burst set before a PO. Compared with the previous alternative scheme, it is considered here that the UE may need to continuously receive multiple cycles of SSBs to achieve downlink synchronization, and the value of S used to determine the location of the reference SSB burst set may be predefined or pre-configured. In addition, the value of S can also be related to the UE capability. UEs with different processing capabilities need to receive different numbers of SSB burst sets to achieve downlink synchronization. The UE can report the minimum value of S supported by it to the network, and the base station can configure at least two WUSs. The reference SSB burst sets used to determine the time domain locations of WUSs correspond to different values of S. The UE monitors the corresponding WUS according to the minimum value of S reported by it, that is, the reference SSB burst set corresponding to the WUS monitored by the UE should be greater than or equal to the minimum value of S supported by it.

In addition, similar to the minimum interval requirement between the WUS and the PO, the above interval between the WUS and the reference SSB burst set used to determine the time domain location of the WUS should also meet the minimum interval requirement, and the minimum interval should reserve the processing time from starting or waking up the PCR to being ready for SSB reception, for example, the processing time including hardware and software startup or wake-up. The interval between the WUS and the reference SSB burst set is the interval between the end point of the WUS and the first SSB or the first actually sent SSB included in SSB burst set. For a high-frequency scenario, the a WUS is a set comprising WUSs with different beam directions, and the interval between the WUS set and the reference SSB burst set is at least one of:

the interval between the end point of the last WUS in the WUS set and the first SSB included in the SSB burst set, as illustrated in FIG. 17, which is a schematic diagram of the interval between the WUS set and the reference SSB burst set according to another embodiment. In FIG. 17, the shaded parts indicate actually sent SSBs;

the interval between the end point of the last WUS in the WUS set and the first actually sent SSB included in the SSB burst set, as illustrated in FIG. 18, which is a schematic diagram of an interval between ae WUS set and a reference SSB burst set according to another embodiment. In FIG. 18, wherein the shaded parts indicate actually sent SSBs;

the interval between the end point of the last WUS in the WUS set and the last actually sent SSB in the SSB burst set, as illustrated in FIG. 19, which is a schematic diagram of one interval between a WUS set and a reference SSB burst set according to another embodiment. In FIG. 19, the shaded parts indicate actually sent SSBs;

the interval between the end point of the kth WUS in the WUS set and the kth actually sent SSB in the SSB burst set, where 1≤k≤Num_Beam, and Num_Beam is the total number of actually sent SSBs included in the SSB burst set, that is, the interval between the WUS in each beam direction and the SSB corresponding to the same beam direction should meet the minimum interval requirement, as illustrated in FIG. 20, which is a schematic diagram of an interval between a WUS set and a reference SSB burst set according to another embodiment.

In FIGS. 9-20, the SSB burst set includes multiple SSBs according to a predefined pattern, and the base station can send some or all of the SSBs in the set. The total number of actually sent SSBs Num_Beam is the total number of directions of beams sent by the base station. WUS#k in the WUS set represents the WUS in the kth beam direction, and PO-PDCCH#k represents the PDCCH monitoring occasion in the kth beam direction corresponding to the PO. The total number of PDCCH monitoring occasions Num_PDCCH corresponding to the PO can exceed the total number of actually sent SSBs in the SSB burst set Num_Beam, and the j-th PDCCH monitoring occasion corresponds to (mod(j, Num_Beam)+1)-th beam direction, 0≤j≤Num_PDCCH-1.

In addition, FIGS. 9-20 only give a simple schematic of the WUS set, the PDCCH monitoring occasions of the PO, and the SSB burst set. WUSs in multiple beam directions included in the WUS set can be continuous or discontinuous in time domain, the multiple PDCCH monitoring occasions corresponding to the PO can be continuous or discontinuous in time domain, and the actually sent SSBs included in the SSB burst set can be continuous or discontinuous in time domain.

UEs with different capabilities can support different values of minimum interval between the WUS and the reference SSB burst set, and the system can define at least two kinds of UE capabilities of minimum intervals between the WUS and the reference SSB burst set. The UE should report the minimum interval between the WUS and the reference SSB burst set supported by it to the network, and the base station can configure at least two WUSs. Different WUSs have different offsets relative to the same reference SSB burst set. That is, different WUS have different intervals from the reference SSB burst set. The UE monitors the corresponding WUS according to the minimum interval between the WUS and the reference SSB burst set reported by it, that is, the interval between the WUS monitored by the UE and the SSB burst set should be greater than or equal to the minimum interval reported by the UE, If there are many WUSs that meet the minimum interval between the WUS and the reference SSB burst set reported by the UE, the UE monitors, among those WUS, the WUS with the minimum interval from the reference SSB burst set.

In addition, or alternatively, UEs with different capabilities can support different values of the minimum interval between the reference SSB burst set and the PO, and the system can define at least two kinds of UE capabilities of minimum intervals between the reference SSB burst set and the PO. The UE should report the minimum interval between the reference SSB burst set and the PO supported by it to the network. The base station can configure at least two WUSs, different WUSs correspond to different reference SSB burst sets, and the intervals between different reference SSB burst sets and the PO are different. The UE determines the corresponding reference SSB burst set according to the minimum interval between the reference SSB burst set and the PO reported by the UE, to monitor the corresponding WUS. That is, the interval between the reference SSB burst set of the WUS monitored by the UE and the PO should be greater than or equal to the minimum interval reported by the UE. If there are multiple reference SSB burst sets that meet the minimum interval reported by the UE, then UE determines the WUS needed to be monitored based on the reference SSB burst set with the minimum interval from the PO, among the reference SSB burst sets.

In the above scheme, the UE can determine the WUS slot by the offset of the WUS relative to the PO or the reference SSB, and also determine the start symbol of the WUS by the information on the WUS location within the slot indicated by the base station. For example, the base station can indicate the start symbol location of the WUS within the slot by the way of a bitmap, such as a bitmap containing 14 bits, each bit corresponding to a symbol within the slot, and the symbol with a bit indication value of "1" being the start symbol of the WUS. The WUS can occupy N consecutive symbols, and N is a positive integer. There can be only one WUS resource in a slot at most, or there can be multiple WUS resources in a slot, and the number of WUS resources in a slot depends on the configuration.

In an alternative scheme, a WUS of a cycle can have one or more monitoring occasions in a duration, that is, the WUS of the cycle can have one or more WUS resources in a duration, and the base station can send the WUS on any one or more of those WUS resources. For example, the UE can monitor the WUS on multiple WUS resources in a time window. If the UE monitors the WUS on one WUS resource, there is no need to monitor other WUS resources in the window. Otherwise, the UE monitors the WUS until monitoring on all WUS resources is completed. The above indication information on the offset based on the PO or the reference SSB burst set can be used to determine the start point and/or end point of the WUS monitoring window. If the WUS configuration information only contains information about the start point or end point of the WUS monitoring window, the WUS configuration information also needs to contain the length information of the WUS monitoring window. Alternatively, the length of the WUS monitoring window is predefined.

In an example, the base station pre-configures the length of the WUS monitoring window, and the configuration of the length of the WUS monitoring window takes a slot as the granularity, so that the UE can monitor the WUS within each slot within the WUS monitoring window. The location of the WUS within each slot are the same, and a slot can contain one or more WUS resources. For example, the base station indicates the start orthogonal frequency division multiplexing (OFDM) symbol locations of one or more WUS resources in a slot in the form of a bitmap, that is, 14 bits correspond to 14 OFDM symbols in a slot, and an indication value of "1" indicates that corresponding OFDM symbol is the start OFDM symbol of a WUS resource.

In another example, the length of the WUS monitoring window is predefined as a slot, and there can be one or more WUS resources in one slot. For example, the base station indicates the start OFDM symbol location of one or more WUS resources in a slot in the form of a bitmap.

Beam Sweeping for WUS Transmission in the current NR system, for a high-frequency scenario, because signal fading is very serious, the base station needs to send signals on a specific analog beam to improve the signal quality at the receiving end. For the broadcast signal/ channel, since the receiving UE may be in multiple directions of the cell, the base station should send the broadcast signal/channel in all different beam directions. The process is called a beam sweeping. If the WUS is supported in the high frequency system, since the WUS is received by a group of UEs in different directions, the transmission of the WUS also needs beam sweeping, and the UE can try to receive the WUS in each downlink beam direction to find the WUS with the best signal quality.

Similar to the beam sweeping of the SSBs, a group of SSBs in different beam directions is called a SSB burst set. For a high-frequency scenario, the WUS mentioned above all refers to a WUS set, and the WUS set can contain WUSs in Num_beam beam directions. For a WUS set, the start point of the WUS mentioned above is the start point of the WUS in the first beam direction in the WUS set, and the end point of the WUS mentioned above is the end point of the WUS in the last beam direction in the WUS set.

WUSs in different beam directions in the WUS set use the same frequency domain resource and different time domain resources, and the WUS time domain mapping in WUS set can comply with a predefined pattern. For example:

1) WUSs in different beam directions in the WUS set are sent in continuous slots. FIG. 21 is a schematic diagram of time domain resources used by WUSs in different beam directions in a WUS set according to another embodiment. As shown in FIG. 21, the WUS set contains three beam directions, and each WUS occupies four consecutive symbols. The WUS set occupies three consecutive slots, and each WUS occupies the same symbol within each slot.

2) WUSs in different beam directions in the WUS set are continuous in time domain, that is, there is no interval. FIG. 22 is a schematic diagram of time domain resources used by WUSs in different beam directions in a WUS set according to another embodiment. As shown in FIG. 22, the WUS set contains WUSs in 3 beam directions, and each WUS occupies 4 consecutive symbols. Here, if the WUSs in all beam directions exceed one subframe, the situation where a WUS is mapped across two slots should be avoided. For example, a WUS can be mapped to the next slot completely, and no WUS may be mapped to remaining symbols of the previous slot, which are not enough to map a complete WUS. In the special case, there will be an interval between WUSs in two beam directions belonging to different slots.

3) There can be a fixed interval between WUSs in different beam directions in the WUS set. FIG. 23 is a schematic diagram of time domain resources used by WUSs in different beam directions in a WUS set according to another embodiment. As shown in FIG.

23, the WUS set contains WUSs in three beam directions, each WUS occupies three consecutive symbols, and two adjacent WUSs are spaced apart by one symbol. Here, if the WUSs in all beam directions exceeds one subframe, the situation where a WUS is mapped across two slots should be avoided. For example, a WUS can be mapped to the next slot completely, and no US may be mapped to remaining symbols of the previous slot that are not enough to map a complete WUS. In the special case, the interval between WUSs in two beam directions belonging to different slots may be larger than the preset interval.

In TDD system, WUS resources determined according to the above predetermined pattern may collide with an uplink symbol. Even if only one symbol in the WUS resource collides with an uplink symbol, the WUS resource determined according to the predetermined pattern cannot be used. Accordingly, the following solutions are provided.

In one solution, the base station indicates the start point of the WUS set, that is, indicating the start point of the WUS in the first beam direction in WUS set, and the UE determines WUS resource in other beam directions based on a predetermined pattern. If the WUS resource collides with the uplink symbol, the corresponding WUS can be delayed to the following first available WUS resource for transmission, and the integrity of the WUS resource can be ensured. For example, it is ensured that WUS resource can occupy multiple consecutive downlink symbols. That is, the start point of the WUS set is indicated by the network, while the end point of the WUS set depends on the uplink and downlink subframe configuration of the MD system, as illustrated in FIG. 24, which is a schematic diagram of time domain resources used by a WUS set according to another embodiment. In FIG. 24, the WUS resource for the third beam direction cannot be used due to collision with the uplink symbol, then the WUS in the third beam direction and the WUS in the fourth beam direction are both delayed for transmission.

In another solution, the base station configures a WI S monitoring window, which contains at least one WUS resource. The base station can configure the start point and the duration of the time window, or the start point and the end point of the time window. Both of the start point and the end point of the time window can use the aforementioned indication method of the offset relative to the PO or the reference SSB. The position of the WUS resources in the time window can be configured by the base station. For example, the start point of the WUS resources in a slot is indicated by a bitmap, and the same WUS resources are repeated in each slot, and/or the configuration of WUS resources in the time window is determined according to the above-mentioned predetermined pattern.

If the WUS resource collides with the uplink symbol, then the corresponding WUS resource is unavailable. The remaining available WUS resources in the window are numbered and periodically correspond to different beam directions in turn. For example, the j-th WUS resource corresponds to the (mod(j, Num_Beam))-th beam direction, that is, the WUS resources periodically correspond to beam directions in turn, as illustrated in FIG. 25, which is a schematic diagram of time domain resources used by a WUS set according to another embodiment. In FIG. 25, after excluding WUS resources colliding with uplink symbols, there are 8 available WUS resources in the WUS monitoring window, and the number of SSBs actually sent by the system is 4. According to the periodically corresponding in turn criterion, the 1st and 5th WUS resources correspond to the 1st beam direction, the 2nd and 6th WUS resources correspond to the 2nd beam direction, the 3rd and 7th WUS resources correspond to the 3rd beam direction, and the 4th and 8th WUS resources correspond to the 4th beam direction. Here, when performing configuration, the base station should ensure that the number of available WUS resources remaining in the time window is not less than the total number of beam directions Num_Beam.

The UE can determine whether a symbol is an uplink symbol according to the parameter tdd-UL-DL-ConfigurationCommon in the system information block; and/or, the UE can determine whether a symbol is an uplink symbol according to the configuration of a PRACH in the system information block. If a symbol is configured with a PRACH, it can be determined that the symbol is an uplink symbol.

In an alternative scheme, the number of WUSs in different beam directions included in the WUS set is the same as the number of SSBs actually sent in the SSB burst set, and there is a one-to-one mapping relationship therebetween, as illustrated in FIG. 26, which is a schematic diagram of relationship between WUSs and SSBs according to another embodiment. In FIG. 26, there is association between the i-th WUS in the WUS set and the i-th actually sent SSB in the SSB burst set, with 1≤i≤B, B being the number of actually sent SSBs in the SSB burst set, B also being the number of WUSs included in the WUS set, and B being a positive integer. The so-called association between the WUS and the SSB means that the UE can assume that both of them are transmitted from the same beam, and the best downlink beam of the WUS detected by UE is also the best downlink beam of an SSB in high probability.

In another alternative scheme, the number of WUSs in different beam directions included in the WUS set is less than the number of actually sent SSBs in the SSB burst set, and there is a one-to-multiple mapping relationship therebetween, as illustrated in FIG. 27, which is a schematic diagram of relationship between WUSs and SSBs according to another embodiment. In FIG. 27, the i-th WUS in the WUS set is associated with the (2*i)-th and (2*i+1)-th actually, sent SSBs in the SSB burst set, 2*B is the number of actually sent SSBs in the SSB burst set, B is the number of WUSs included in the WUS set, and B is a positive integer. AWUS being associated with two SSBs means that the UE can assume that the beam for transmitting a WUS is one of or a mixed beam of the beams for transmitting two correspondingly associated SSBs, For example, a WUS can use a wider beam than that of the SSB. The advantage of the design is that the number of different beams in a WUS set can be reduced, thus reducing overall cost of the WUS resources.

In another alternative scheme, there is no association between beam directions used by WUSs included in a WUS set and beam directions used by actually sent SSBs in an SSB burst set.

Signal Sequence of WUS

To reduce the complexity and power consumption of detection of a WUS by a terminal, the WUS can be carried by a physical signal sequence. For example, a piece of status information is indicated by a WUS signal sequence, and the base station may or may not send the WUS sequence. If the UE monitors the WUS sequence, it starts or wakes up the PCR to monitor a PO, otherwise, it does not need to start or wake up the PCR to monitor the PO. Or, two pieces of status information (i.e., 1-bit information) are indicated by two WUS signal sequences, which respectively indicate to start (or wake up) the PCR to monitor the PO and not to start (or wake up) the PCR, and the base station needs to send one of these two WUS sequences.

Similar to the signal sequence of the PSS/SSS of the NR system, the signal sequence carrying a WUS can be the M sequence or the gold sequence. The generated WUS signal sequence is modulated through binary phase shift keying (BPSK) or on-off keying (OOK) and then mapped to frequency domain subcarriers of OFDM symbols. In order to reduce reception bandwidth of the WUS and ensure good detection performance, a long WUS sequence can be mapped to multiple consecutive symbols. On each symbol, the WUS can occupy the same or different number of subcarriers. The mapping order can be frequency domain first and then time domain. For example, a WUS signal sequence can be mapped to all OFDM symbols in a slot.

In addition, in order to improve the inter-cell anti-interference performance and intra-cell anti-interference performance of WUS signals, the WUS sequences can be scrambled, such as in bit level or resource element (RE) level. Scrambling sequences and/or generating the WUS sequences can be based on at least one of the following parameters:

1) physical cell ID;
2) the index of the system frame where the first PDCCH monitoring occasion corresponding to the PO which is associated with the WUS is located;
3) the index of the slot where the first PDCCH monitoring occasion corresponding to the PO which is associated with the WUS is located;
4) the index of the symbol where the first PDCCH monitoring occasion corresponding to the PO which is associated with the WUS is located;
5) the index of the system frame where the start point of the WUS is located;
6) the index of the slot where the start point of the WUS is located;
7) the index of the symbol where the start point of the WUS is located;
8) the index of the SSB in the same beam direction corresponding to the WUS;
9) TMSI number of the UE.

The advantage of using the above parameters to generate a WUS sequence or scrambling a sequence is that the anti-interference performance of the WUS sequence can be improve, including the intra-cell or inter-cell anti-interference performance.

Frequency Domain Location of WUS

Receiving bandwidth of a UE will affect the power consumption, so the radio frequency bandwidth used to receive a WUS should be smaller than the minimum bandwidth supported by the current 5G NR system, to achieve the purpose of further saving power, that is, the receiving bandwidth of the WUR can he smaller than that of the PCR. For example, for an NR UE that is not reduced capability (Red-Cap), the minimum receiving bandwidth of the PCR is 20 MHz, while the receiving bandwidth of the WUR can he as small as 5 MHz.

In order for the UE to receive a WUS with low power consumption, the WUS can he carried by a physical signal sequence, and transmission of the WUS can be based on OFDM waveform for simplicity of implementation. For example, a WUS signal sequence can be mapped to a segment of continuous subcarriers of an OFDM symbol, for example, a WUS signal sequence is mapped to multiple continuous physical resource blocks (PRBs).

To support a UE to receive a WUS without initial synchronization, and prevent the WUS from being interfered by signals in adjacent subcarriers, some guard subcarriers can be set at both ends of the frequency domain location to which the WUS is mapped, that is, guard subcarriers are blank and nothing is sent thereon. For example, supposing that a WUS occupies two consecutive PRBs, the WUS sequence actually is mapped to only 20 subcarriers in the two PRBs, and two guard subcarriers at each of both end of the frequency domain are reserved.

The subcarrier spacing of the WUS can have the following alternative schemes:

1) using the same subcarrier spacing as the initial downlink bandwidth part (BWP) configured in the system information block (SIB) of the cell;

2) using the subcarrier spacing indicated by the common subcarrier spacing parameter subCarrierSpacingCommon configured in the physical broadcast channel (PBCH);

3) using a predefined subcarrier spacing, for example, for the sub-6 GHz low frequency band, the WUS always uses a fixed subcarrier spacing of 15 kHz; for the above-6 GHz high frequency band, the WUS always uses a fixed subcarrier spacing of 120 kHz;

4) using the subcarrier spacing dedicatedly configured for the WUS.

The indication of the frequency domain location of the WUS can have the following alternative schemes:

1) indicating the start frequency domain location of the WUS by an offset relative to the common reference point (point A) of the cell resource block grid;

2) indicating the start frequency domain location of the WUS by an offset relative to the lowest frequency subcarrier or the highest frequency subcarrier of the initial downlink BWP of the cell, the initial downlink BWP is configured through the SIB.

3) indicating the start frequency domain location of the WUS by an offset relative to the lowest frequency subcarrier or the highest frequency subcarrier of the carrier bandwidth of the cell, the carrier bandwidth is a carrier bandwidth corresponding to the WUS subcarrier interval and configured through the parameter SCS-SpecificCarrier in the SIB.

4) indicating the start frequency domain location of the WUS by the absolute radio frequency channel number (ARFCN);

In the above indication method, the frequency-domain offset based on the reference point refers to the upward or downward offset based on the reference point, for example, the downward offset based on the reference point, e.g., point A, etc. The indication of the offset takes a PRB as the granularity, and the bandwidth of a PRB is determined by the subcarrier spacing of the WUS.

Conditions for Monitoring WUS

In an alternative scheme, whether a UE monitors a WUS can depend on the implementation of the UE. The advantage is that the UE can decide whether to monitor the WUS according to the actual state. If the UE monitors the WUS, it will decide whether to monitor the corresponding PO according to the monitoring result of the WUS. If the UE does not monitor the WUS, it directly monitors the corresponding PO. For example, when the remaining power of the UE device is sufficient, the UE can directly monitor the PO without monitoring the WUS. When the remaining power of the UE device is insufficient, the UE can monitor the WUS, and monitor the PO only when the WUS is monitored.

In an alternative scheme, if the UE does not detect any WUS for N consecutive cycles, where N is a predefined or pre-configured positive integer, that is, PO is not monitored for N consecutive paging cycles, then in the next paging cycle, the UE should monitor the PO regardless of whether the WUS is detected. In other words, the UE can directly monitor the PO without monitoring the WUS. The advantage of the design is that if a WUS is missed, the UE can also be paged by the network by directly monitoring the PO.

In another alternative scheme, in some specific paging cycles, the UE monitors the PO regardless of whether the WUS is detected or not. In other words, the UE can directly monitor the PO without monitoring the WUS. For other paging cycles, the UE can monitor the WUS and decide whether to monitor the PO or not based on monitoring result of the WUS. Those specific paging cycles can at equal interval, for example, occurring every M cycles, where M is a predefined or preconfigured positive integer. The advantage of the design is that if the WUS is missed, the UE can also be paged by the network by directly monitoring the PO.

In another alternative scheme, in order to ensure the robustness of WUS performance, to avoid that the UE cannot he paged by the network in time due to a missed detection of the WUS, only a UE with good channel condition will monitor the WUS and decide whether to monitor the PO according to monitoring result of the WUS; while a UE with poor channel condition will monitor the PO regardless of whether the WUS is detect or not, in other words, it can directly monitor the PO without monitoring the WUS. For example, only the UE with reference signal received power (RSRP) of the serving cell meeting a preset threshold can monitor the WUS; on the contrary, the UE with the RSRP lower than the preset threshold does not need to monitor the WUS. The preset threshold can be preconfigured by the network.

Available Range of WUS Configuration Information

In an alternative scheme, the available area of WUS configuration information is only the cell providing the WUS configuration information. If the cell on which the UE camps changes due to the mobility of the UE, the UE needs to receive new WUS configuration information in the new camped cell, that is, the WUS information configured by the original camped cell will no longer be applicable.

In another alternative scheme, the available area of the WUS configuration information is a tracking area of the network, that is, all cells in the same tracking area use the same WUS configuration information. If the UE's camped cell changes and the old and new camped cells belong to the same tracking area, the WUS information configured from the original camped cell can still be used.

Accordingly, a low-power wake-up signal for reducing UE power consumption is provided.

FIG. 28 is a block diagram of a UE according to an embodiment.

Referring to FIG. 28, the UE includes a transceiver 2810, a controller 2820 and a. memory 2830. The transceiver 2810. the controller 2820, and the memory 2830 are configured to perform the operations of the embodiments of the present disclosure. Although the transceiver 2810, the controller 2820 and the memory 2830 are shown as separate entities, they can be implemented as a single entity, such as a single chip. The transceiver 2810, the controller 2820 and the memory 2830 may be electrically connected or coupled to each other. Although the transceiver 2810 is shown as one transceiver unit, it may be composed of multiple transceiver units. Transceiver 2810 can send signals to other network devices and receive signals from other network entities, such as base stations or core network nodes. The controller 2820 may include one or more processing units, and may control the network device to perform operations and/or functions according to one of the above embodiments. The memory 2830 may store instructions for implementing the operations and/or functions of one of the above embodiments.

Those skilled in the art will understand that the above illustrative embodiments are described herein and are not intended to be limiting. It should be understood that any two or more of the embodiments disclosed herein can be combined in any combination. In addition, other embodiments can be utilized and other changes can be made without departing from the spirit and scope of the subject matter presented herein. It will be readily understood that aspects of the disclosure as generally described herein and shown in the drawings can be arranged, replaced, combined, separated and designed in various different configurations, all of which are contemplated herein.

Those skilled in the art will also understand that various illustrative logical blocks, modules, circuits, and steps described in the present disclosure can be implemented as hardware, software, or combinations of both. To clearly illustrate the interchangeability between hardware and software, various illustrative components, blocks, modules, circuits, and steps are generally described above in the form of their functional sets. Whether such a function set is implemented as hardware or software depends on the specific application and the design constraints imposed on the overall system.

The various illustrative logic blocks, modules, and circuits described in the present disclosure can be implemented with a general purpose processor, a digital signal processor (DSP), an application specific integrated circuit (ASIC), a field programmable gate array (FPGA) or other programmable logic devices, discrete gate or transistor logic, discrete hardware components, or any combination thereof designed to perform the functions described herein, The general-purpose processor may be a microprocessor, but in the alternative, the processor may be any conventional processor, controller, microcontroller, or mode machine. The processor can also be implemented as a combination of computing devices, such as a combination of a DSP and a microprocessor, multiple microprocessors, one or more microprocessors cooperating with a DSP core, or any other such configuration.

The steps of the method or algorithm described in the present disclosure can be directly embodied in hardware, in a software module performed by a processor, or in a combination of the two. The software modules may reside in RAM memory, flash memory, ROM memory, electronically erasable read only memory (EPROM) memory, electronically erasable programmable read only memory (EEPROM) memory, registers, hard disks, removable disks, or any other form of storage media known in the art. An exemplary storage medium is coupled to the processor so that the processor can read and write information from/to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

In one or more designs, the functions can be implemented in hardware, software, firmware, or any combination thereof. If implemented in software, each function can be stored on or transmitted by a computer-readable medium as one or more instructions or codes. Computer readable media include both computer storage media and communication media, the latter including any media that facilitates the transfer of computer programs from one place to another. Storage media can be any available media that can be accessed by general-purpose or special-purpose computers.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a user equipment (UE), the method comprising:
   receiving, from a network device, configuration information on a wake-up signal, wherein the configuration information on the wake-up signal includes a time offset of the wake-up signal relative to a reference point;
   monitoring the wake-up signal based on the configuration information on the wake-up signal in a radio resource control (RRC) inactive or idle mode, wherein the wake-up signal comprises a single wake-up signal or a wake-up signal set consisting of multiple wake-up signals; and
   based on a result of monitoring the wake-up signal, deciding whether to monitor a corresponding paging occasion (PO).

2. The method of claim 1, further comprising:
   reporting, to a network device, information on at least one of whether the UE has quasi-static characteristics and whether the UE has capability to monitor the wake-up signal.

3. The method of claim 2, wherein, based on the UE having the quasi-static characteristics, the UE is configured not to perform cell measurement in the RRC inactive or idle mode.

4. The method of claim 1,
   wherein the wake-up signal indicates at least one of monitoring a paging occasion, monitoring the paging occasion in multiple continuous cycles, or monitoring the paging occasion within a predefined duration.

5. The method of claim 2, wherein based on the UE having the capability of monitoring the wake-up signal, the reporting to the network device comprises at least one UE type to which the UE belongs to, and
   wherein the at least one UE type comprises:
      a UE type with both a first receiver and a second receiver, with the first receiver being configured to receive channels/signals other than the wake-up signal, and the second receiver is configured to receive the wake-up signal; or
      a UE type with only the first receiver, with the first receiver being configured to receive the wake-up signal and other channels/signals.

6. The method of claim 1,
   wherein the configuration information on the wake-up signal is received through at least one of an RRC release message and system information.

7. The method of claim 6,
   wherein the reference point includes at least one of:
      information on the time domain location of the paging occasion;
      information on the time domain location of a reference synchronization signal block (SSB) burst set, with the reference SSB burst set being a first or N-th SSB burst before the paging occasion, with N being a positive integer; and wherein granularity of the time offset is at least one of a radio frame, a slot or a symbol, wherein granularity of the radio frame is the time offset of the radio frame where a start point of the wake-up signal is located relative to the radio frame where the reference point is located, wherein offset in the granularity of the slot is the time offset of the slot where the start point of the wake-up signal is located relative to the slot where the reference point is located, and wherein offset in the granularity of the symbol is an offset of a start symbol of the wake-up signal relative to a start symbol of the reference point.

8. The method of claim 7, wherein at least one of a first interval, a second interval, or a third interval is configured, wherein the first interval is configured between the wake-up signal and a location where the paging occasion meets a requirement of a first minimum value;

wherein the second interval is configured between the wake-up signal and a location where the reference SSB burst set meets a requirement of a second minimum value; and wherein the third interval is configured between the reference SSB burst set and a location where the paging occasion meets a requirement of a third minimum value.

9. The method of claim 8, wherein at least two values of a predefined minimum first interval is configured, and the UE reports the predefined minimum first interval supported by the UE to the network device, or wherein at least two values of a predefined minimum second interval is configured, and the UE reports the predefined minimum second interval supported by the UE to the network device, or wherein at least two values of a predefined minimum third interval is configured, and the UE reports the predefined minimum third interval supported by the UE to the network device.

10. The method of claim 9, wherein at least two wake-up signals are configured, wherein the at least two wake-up signals are configured to have at least one of:

different values of the first interval, wherein the UE monitors one of the at least two wake-up signals according to the predefined minimum first interval supported by the UE; and different values of at least one of the second interval and different values of the third interval, and wherein the UE monitors one of the at least two wake-up signals according to at least one of the predefined minimum second interval and the predefined minimum third interval supported by the UE.

11. The method of claim 7, wherein the offset of the wake-up signal relative to the paging occasion includes at least one of:

an offset of the wake-up signal relative to the first physical downlink control channel (PDCCH) monitoring occasion corresponding to the paging occasion, an offset of each wake-up signal in the wake-up signal set relative to the first PDCCH monitoring occasion corresponding to the paging occasion, and

an offset of each wake-up signal in the wake-up signal set relative to the first PDCCH monitoring occasion associated with the same SSB corresponding to the paging occasion; and wherein, the offset of the wake-up signal relative to the reference SSB burst set includes any one of:

an offset of the wake-up signal relative to a first SSB or a first actually sent SSB in the reference SSB burst set, an offset of each wake-up signal in the wake-up signal set relative to the first SSB or the first actually sent SSB in the reference SSB burst set, and an offset of each wake-up signal in the wake-up signal set relative to the SSB with a same beam direction in the reference SSB burst set.

12. The method of claim 7, wherein a first interval between the wake-up signal and the paging occasion includes at least one of:

an interval between the wake-up signal and the first physical downlink control channel (PDCCH) monitoring occasion corresponding to the paging occasion, intervals between each wake-up signal of the wake-up signal set and the first PDCCH monitoring occasion associated with a same SSB corresponding to the paging occasion;

wherein a second interval between the wake-up signal and the reference SSB burst set includes at least one of:

an interval between the wake-up signal and the first SSB or a first actually sent SSB in the reference SSB burst set, and an interval between each wake-up signal in the wake-up signal set and an SSB corresponding to the same beam in the reference SSB burst set; and wherein the interval between the reference SSB burst set and the corresponding paging occasion include at least one of:

an interval between a last SSB or a last actually sent SSB in the reference SSB burst set and the first PDCCH monitoring occasion corresponding to the paging occasion, and an interval between each actually sent SSB in the reference SSB burst set and a first scheduled PDCCH monitoring occasion with a same beam corresponding to the paging occasion.

13. The method of claim 7, wherein:

if the granularity of the time offset is a radio frame, the configuration information on the wake-up signal further includes the location information on the wake-up signal within the radio frame; or if the granularity of the time offset is a slot, the configuration information on the wake-up signal further includes the location information on the wake-up signal within the slot.

14. The method of claim 13, wherein:

a slot location of at least one wake-up signal resource within the radio frame is indicated by a bitmap; or a symbol location of at least one wake-up signal resource within the slot is indicated by a bitmap.

15. The method of claim 6, wherein the configuration information on the wake-up signal includes at least one of:

information on at least one of a start point and an end point of a wake-up signal monitoring window, with the information on the start point being indicated by the time offset of the wake-up signal monitoring window relative to the reference point, the information on the end point being indicated by an interval between the wake-up signal monitoring window and the reference point, and the reference point including a time domain location of the paging occasion or a time domain location of a reference synchronization signal block (SSB) burst set; and length information on the wake-up signal monitoring window.

16. The method of claim 15, wherein the time domain location of at least one wake-up signal resource within the wake-up signal monitoring window is determined based on at least one of:

a predefined pattern; and indication information on a time domain location of at least one wake-up signal resource within the wake-up signal monitoring window.

17. The method of claim 16, wherein the at least one wake-up signal resource within the wake-up signal monitoring window is periodically associated with an actually sent SSB in the SSB burst set, and the wake-up signal and the associated SSB use a same beam direction.

18. The method of claim 16, wherein the time domain location of the at least one wake-up signal resource within the monitoring window is indicated by a bitmap.

19. The method of claim 17, further comprising:

detecting a resource where all of the symbols, on which a wake-up signal resource is located, are downlink as being an available wake-up signal resource; and periodically associating available wake-up signal resources with actually sent SSBs in the SSB burst set.

20. A user equipment (UE) in a communication network, comprising:

a transceiver; and a processor coupled to the transceiver, wherein the processor is configured to:

receive, from a network device, configuration information on a wake-up signal, wherein the configuration information on the wake-up signal includes a time offset of the wake-up signal relative to a reference point;

monitor the wake-up signal based on the configuration information on the wake-up signal in a radio resource control (RRC) inactive or idle mode, wherein the wake-up signal comprises a single wake-up signal or a wake-up signal set consisting of multiple wake-up signals; and based on a result of monitoring the wake-up signal, decide whether to monitor a corresponding paging occasion.

* * * * *